(12) United States Patent
Matsui

(10) Patent No.: US 7,265,909 B2
(45) Date of Patent: Sep. 4, 2007

(54) LENS SUBSTRATE, A TRANSMISSION SCREEN AND A REAR PROJECTION DEVICE

(75) Inventor: Kuniyasu Matsui, Hotaka (JP)

(73) Assignee: Seiko Epson Corporation (JP)

( * ) Notice: Subject to any disclaimer, the term of this patent is extended or adjusted under 35 U.S.C. 154(b) by 101 days.

(21) Appl. No.: 11/252,315

(22) Filed: Oct. 17, 2005

(65) Prior Publication Data

US 2006/0082902 A1    Apr. 20, 2006

(30) Foreign Application Priority Data

Oct. 20, 2004   (JP)   .............................. 2004-306231

(51) Int. Cl.
G02B 27/10 (2006.01)
G03B 21/60 (2006.01)
G03B 21/56 (2006.01)

(52) U.S. Cl. ........................ 359/620; 359/456; 359/460

(58) Field of Classification Search ................ 359/453, 359/456, 457, 460, 620, 626
See application file for complete search history.

(56) References Cited

U.S. PATENT DOCUMENTS

| | | | |
|---|---|---|---|
| 5,880,887 A * | 3/1999 | Goto | ........................... 359/626 |
| 6,046,855 A * | 4/2000 | Goto | ........................... 359/619 |
| 6,865,834 B2 * | 3/2005 | Oda et al. ..................... | 40/454 |
| 7,061,682 B2 * | 6/2006 | Yamashita et al. .......... | 359/619 |
| 2006/0087025 A1 * | 4/2006 | Shimizu | ...................... 257/696 |
| 2006/0087741 A1 * | 4/2006 | Shimizu | ...................... 359/619 |
| 2006/0087742 A1 * | 4/2006 | Shimizu | ...................... 359/619 |
| 2006/0109549 A1 * | 5/2006 | Shimizu | ...................... 359/457 |
| 2006/0109550 A1 * | 5/2006 | Shimizu | ...................... 359/457 |
| 2006/0114558 A1 * | 6/2006 | Shimizu | ...................... 359/457 |

FOREIGN PATENT DOCUMENTS

| | | |
|---|---|---|
| JP | A-11-125704 | 5/1999 |
| JP | 2001-209130 | 8/2001 |
| KR | 1999-37290 | 5/1999 |

OTHER PUBLICATIONS

Communication from Korean Patent Office regarding corresponding Korean Patent Application No. 10-2005-0099053.

* cited by examiner

Primary Examiner—David N. Spector
(74) Attorney, Agent, or Firm—Harness, Dickey & Pierce, P.L.C.

(57) ABSTRACT

A lens substrate (microlens substrate 1) having a first surface and a second surface opposite to the first surface is disclosed. Light is allowed to enter the lens substrate from the first surface thereof and then exit from the second surface thereof. The lens substrate includes: a plurality of convex lenses (microlenses 21) formed on the first surface of the lens substrate from which the light is allowed to enter the lens substrate; and a colored portion 22 provided on the first surface of the lens substrate with the plurality of convex lenses. The colored portion 22 is constituted from a plurality of regions each having a different content by percentage of a coloring agent, and the plurality of regions are laminated in the thickness direction of the colored portion 22.

9 Claims, 10 Drawing Sheets

LENS SUBSTRATE, A TRANSMISSION SCREEN AND A REAR PROJECTION DEVICE

CROSS-REFERENCE TO RELATED APPLICATION

This application claims priority to Japanese Patent Application No. 2004-306231 filed Oct. 20, 2004, which is hereby expressly incorporated by reference herein in its entirety.

FIELD OF THE INVENTION

The present invention relates to a lens substrate, a method of manufacturing a lens substrate, a transmission screen, and a rear projection.

BACKGROUND OF THE INVENTION

In recent years, demand for a rear projection (such as a rear projection type television) is becoming increasingly strong as a suitable display for a monitor for a home theater, a large screen television, or the like. In such a rear projection, in order to improve contrast of an image to be projected, it is required to inhibit the reflection of outside light from an emission side (that is, viewer side) of the image light of the rear projection while inhibiting a drop of the intensity of the image light. In order to achieve such an object, a screen (rear projection type screen) in which a translucent front panel whose viewing surface side (light emission surface side) is subjected to a coloring process is arranged at the light emission surface of a lenticular lens (lenticular lens sheet) is proposed (for example, see JP-A-2001-209130).

However, in such a screen, it is difficult to prevent reflection of outside light (reflections thereof) sufficiently. Further, in the case where the thickness of the colored layer formed by means of the coloring process is enlarged or the content by percentage of a coloring agent in the colored layer is heightened in order to prevent the reflection of outside light (reflections thereof) sufficiently, there is a problem that light transmission of the screen is lowered extremely. Namely, in the structure of the screen proposed in JP-A-2001-209130, it is difficult to heighten contrast of an image projected through the screen sufficiently.

SUMMARY OF THE INVENTION

It is one object of the invention to provide a lens substrate for a transmission screen and/or a rear projection that can obtain an image having excellent contrast (in particular, that can not only have excellent light transmission (that is, the maximum luminance of the transmission screen and/or the rear projection is higher), but also obtain an image having excellent contrast).

It is another object of the invention to provide a method of manufacturing the lens substrate described above efficiently.

Further, it is yet another object of the invention to provide a transmission screen and a rear projection with the lens substrate described above.

In order to achieve the above objects, in one aspect of the invention, the invention is directed to a lens substrate having a first surface and a second surface opposite to the first surface. Light is allowed to enter the lens substrate from the first surface thereof and then exit from the second surface thereof. The lens substrate includes:

a plurality of convex lenses formed on the first surface of the lens substrate from which the light is allowed to enter the lens substrate; and a colored portion provided on the first surface of the lens substrate with the plurality of convex lenses, the colored portion being constituted from a plurality of regions each having a different content by percentage of a coloring agent, the plurality of regions being laminated in the thickness direction of the colored portion.

This makes it possible to provide a lens substrate for a transmission screen and/or a rear projection that can obtain an image having excellent contrast (in particular, that can not only have excellent light transmission (that is, the maximum luminance of the transmission screen and/or the rear projection is higher), but also obtain an image having excellent contrast). In particular, it is possible to provide a lens substrate for a transmission screen and/or a rear projection that can heighten light transmission that enters the lens substrate from the first surface thereof and exit from the second surface thereof sufficiently, and to prevent the outside light from having an influence on the projected image by attenuating the light (outside light) entering from the side opposite to the light incident side of the lens substrate (that is, the incident side of light to enter the lens substrate) efficiently.

In the lens substrate of the invention, it is preferable that the plurality of regions comprises:

a first region provided on the first surface of the lens substrate, the first region having a predetermined content by percentage of the coloring agent; and a second region provided on the first region, the second region having content by percentage higher than that of the first region.

Thus, it is possible to prevent the outside light from having an influence on the projected image by attenuating the light (outside light) entering from the side opposite to the light incident side of the lens substrate (that is, the incident side of light to enter the lens substrate) efficiently while maintaining to heighten the light transmission that enters the lens substrate from the first surface thereof and exit from the second surface thereof sufficiently.

In the lens substrate of the invention, it is preferable that, in the case where the thickness of the first region is defined as $D_1$ (μm) and the thickness of the second region is defined as $D_2$ (μm), then $D_1$ and $D_2$ satisfy the relation: $0.1 \leq D_1/D_2 \leq 80$.

Thus, it is possible to prevent the outside light from having an influence on the projected image by attenuating the light (outside light) entering from the side opposite to the light incident side of the lens substrate (that is, the incident side of light to enter the lens substrate) efficiently while maintaining to heighten the light transmission that enters the lens substrate from the first surface thereof and exit from the second surface thereof, in particular.

In the lens substrate of the invention, it is preferable that each of the plurality of regions is a layer having the different content by percentage of the coloring agent, the colored portion being constituted from a laminated structure including the plurality of layers.

Thus, it is possible to prevent the outside light from having an influence on the projected image by attenuating the light (outside light) entering from the side opposite to the light incident side of the lens substrate (that is, the incident side of light to enter the lens substrate) efficiently while maintaining to heighten the light transmission that enters the lens substrate from the first surface thereof and exit from the second surface thereof, in particular.

In the lens substrate of the invention, it is preferable that the lens substrate includes a microlens substrate.

This makes it possible to provide a lens substrate for a transmission and/or a rear projection that can obtain excellent contrast of the projected image particularly.

In the lens substrate of the invention, it is preferable that the lens substrate is formed of an acrylic based resin as a main material.

Since the acrylic based resin has excellent heat resistance, light resistance and workability, dimensional accuracy and mechanical strength when it is formed in addition to excellent transparency, the acrylic based resin is suitable for a constituent material of the lens substrate. However, in a conventional coloring method, it is difficult to color the surface of the lens substrate. In the invention, it is possible to form the colored portion even on the main substrate formed of the acrylic based resin having such a hardly-colored characteristic (in particular, hardly-stained characteristic). Therefore, by forming the lens substrate from the acrylic based resin as a main material, it is possible to provide a lens substrate having excellent various characteristics and reliability, in particular.

In the lens substrate of the invention, it is preferable that the thickness of the colored layer is in the range of 1 to 10 μm.

This makes it possible to provide a lens substrate for a transmission and/or a rear projection that can obtain excellent contrast of the projected image.

In another aspect of the invention, the invention is directed to a method of manufacturing a lens substrate having a first surface and a second surface opposite to the first surface. The lens substrate includes a plurality of convex lenses formed on the first surface thereof and a colored layer provided on the first surface of the lens substrate with the plurality of convex lenses. The colored portion is constituted from a plurality of regions each having a different content by percentage of a coloring agent. Light is allowed to enter the lens substrate from the first surface thereof and then exit from the second surface thereof. The method includes the steps of:

preparing a base substrate, the base substrate being provided with the plurality of convex lenses formed on the first surface thereof;

supplying a process liquid containing a benzyl alcohol onto the first surface of the base substrate to subject the base substrate to a process using the process liquid; and supplying the coloring agent onto the first surface of the base substrate that has been subjected to the process using the process liquid.

This makes it possible to provide a method of efficiently manufacturing a lens substrate for a transmission screen and/or a rear projection that can obtain an image having excellent contrast (in particular, that can not only have excellent light transmission (that is, the maximum luminance of the transmission screen and/or the rear projection is higher), but also obtain an image having excellent contrast). In particular, it is possible to provide a lens substrate for a transmission screen and/or a rear projection that can heighten light transmission that enters the lens substrate from the first surface thereof and exit from the second surface thereof sufficiently, and prevent the outside light from having an influence on the projected image by attenuating the light (outside light) entering from the side opposite to the light incident side of the lens substrate (that is, the incident side of light to enter the lens substrate) efficiently.

Further, it is possible to form the colored portion efficiently while preventing a harmful influence on the main substrate on which the colored portion is to be formed (for example, deterioration of the constituent material of the main substrate) from being generated sufficiently. In particular, even though the main material onto which a coloring liquid is to be supplied is formed of a material such as an acrylic based resin that it is difficult to color in a conventional method, it is possible to color the main substrate easily and surely. Moreover, in the case where the colored portion is constituted from a first region and a second region, it is possible to form the first and second regions on the main substrate easily and surely.

In the method of manufacturing a lens substrate according to the invention, it is preferable that the content by percentage of the benzyl alcohol in the process liquid is in the range of 0.01 to 10.0% by weight.

This makes it possible to form the colored portion 22 efficiently while preventing a harmful influence on the main substrate on which the colored portion is to be formed (for example, deterioration of the constituent material of the main substrate) from being generated sufficiently.

In the method of manufacturing a lens substrate according to the invention, it is preferable that the process liquid further contains a benzophenone based compound and/or a benzotriazole based compound.

This makes it possible to form the colored portion efficiently while preventing a harmful influence on the main substrate on which the colored portion is to be formed (for example, deterioration of the constituent material of the main substrate) from being generated sufficiently.

In the method of manufacturing a lens substrate according to the invention, it is preferable that the total content by percentage of the benzophenone based compound and the benzotriazole based compound in the process liquid is in the range of 0.001 to 10.0% by weight.

This makes it possible to form the colored portion efficiently while preventing a harmful influence on the main substrate on which the colored portion is to be formed (for example, deterioration of the constituent material of the main substrate) from being generated sufficiently.

In the method of manufacturing a lens substrate according to the invention, it is preferable that, in the case where the content by percentage of the benzophenone-based compound in the process liquid is defined as X (% by weight) and the total content by percentage of the benzophenone based compound and the benzotriazole based compound in the process liquid is defined as Y (% by weight), then X and Y satisfy the relation: $0.001 \leq X/Y \leq 10000$.

This makes it possible to form a suitable colored portion easily and surely while preventing a harmful influence on the main substrate on which the colored portion is to be formed (for example, deterioration of the constituent material of the main substrate) from being generated sufficiently.

In the method of manufacturing a lens substrate according to the invention, it is preferable that the process liquid supplying step includes the steps of:

supplying a first process liquid containing a benzyl alcohol of a predetermined content by percentage onto the first surface of the base substrate to subject the base substrate to a process using the first process liquid; and supplying a second process liquid containing a benzyl alcohol of content by percentage lower than that in the first process liquid onto the first surface of the base substrate to subject the base substrate to a process using the second process liquid.

This makes it possible to form the first and second regions each having a desired thickness and a desired content by percentage of the coloring agent easily and surely.

In the method of manufacturing a lens substrate according to the invention, it is preferable that, in the case where the content by percentage of the benzyl alcohol in the first process liquid is defined as $C_1$ (gram per liter) and the content by percentage of the benzyl alcohol in the second process liquid is defined as $C_2$ (gram per liter), then $C_1$ and $C_2$ satisfy the relation: $1.1 \leq C_1/C_2 \leq 5.0$.

This makes it possible to form the first and second regions each having a desired thickness and a desired content by percentage of the coloring agent easily and surely.

In still another aspect of the invention, the invention is directed to a transmission screen. The transmission screen of the invention includes:

a Fresnel lens formed with a plurality of concentric prisms on one major surface thereof, the one major surface of the Fresnel lens constituting an emission surface thereof; and the lens substrate of the invention, the lens substrate being arranged on the side of the emission surface of the Fresnel lens so that the first surface thereof faces the Fresnel lens.

This makes it possible to provide a transmission screen by which an image having excellent contract can be obtained.

In yet another aspect of the invention, the invention is directed to a rear projection. The rear projection of the invention includes the transmission screen defined as described above.

This makes it possible to provide a rear projection by which an image having excellent contract can be obtained.

BRIEF DESCRIPTION OF THE DRAWINGS

The foregoing and other objects, features and advantages of the invention will become more readily apparent from the following detailed description of preferred embodiments of the invention which proceeds with reference to the appending drawings.

DETAILED DESCRIPTION OF THE INVENTION

Preferred embodiments of a lens substrate, a method of manufacturing a lens substrate, a transmission screen and a rear projection according to the invention will now be described in detail with reference to the appending drawings.

Figure 1:
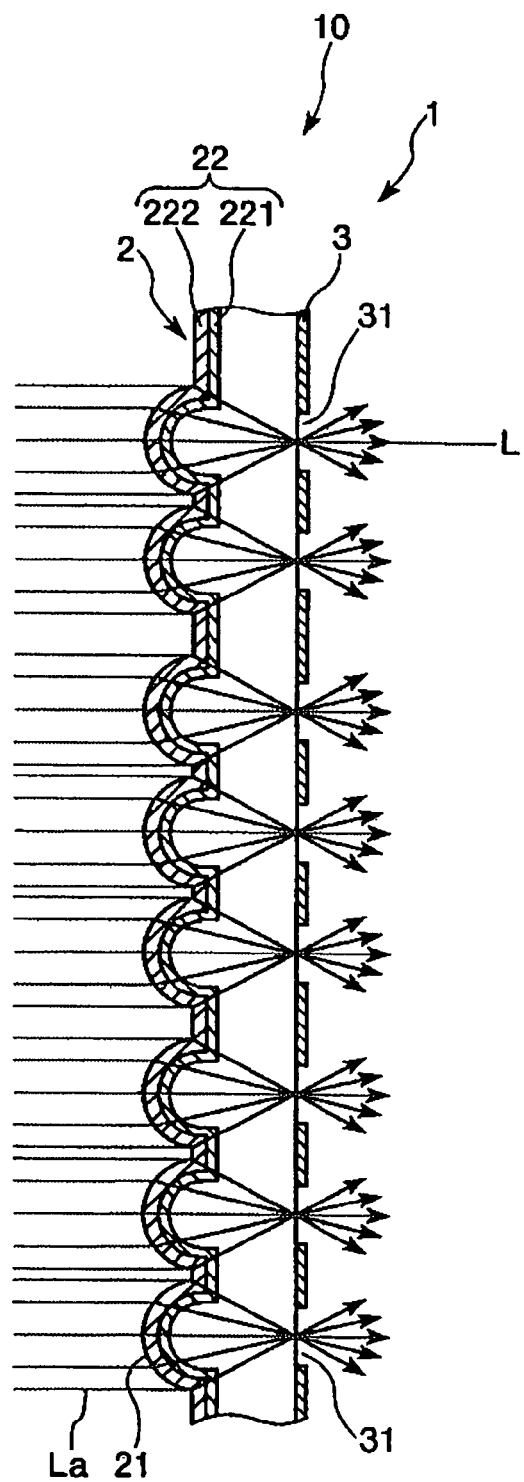
FIG. 1 is a longitudinal cross-sectional view which schematically shows a lens substrate (microlens substrate) in a first embodiment according to the invention.
Figure 2:
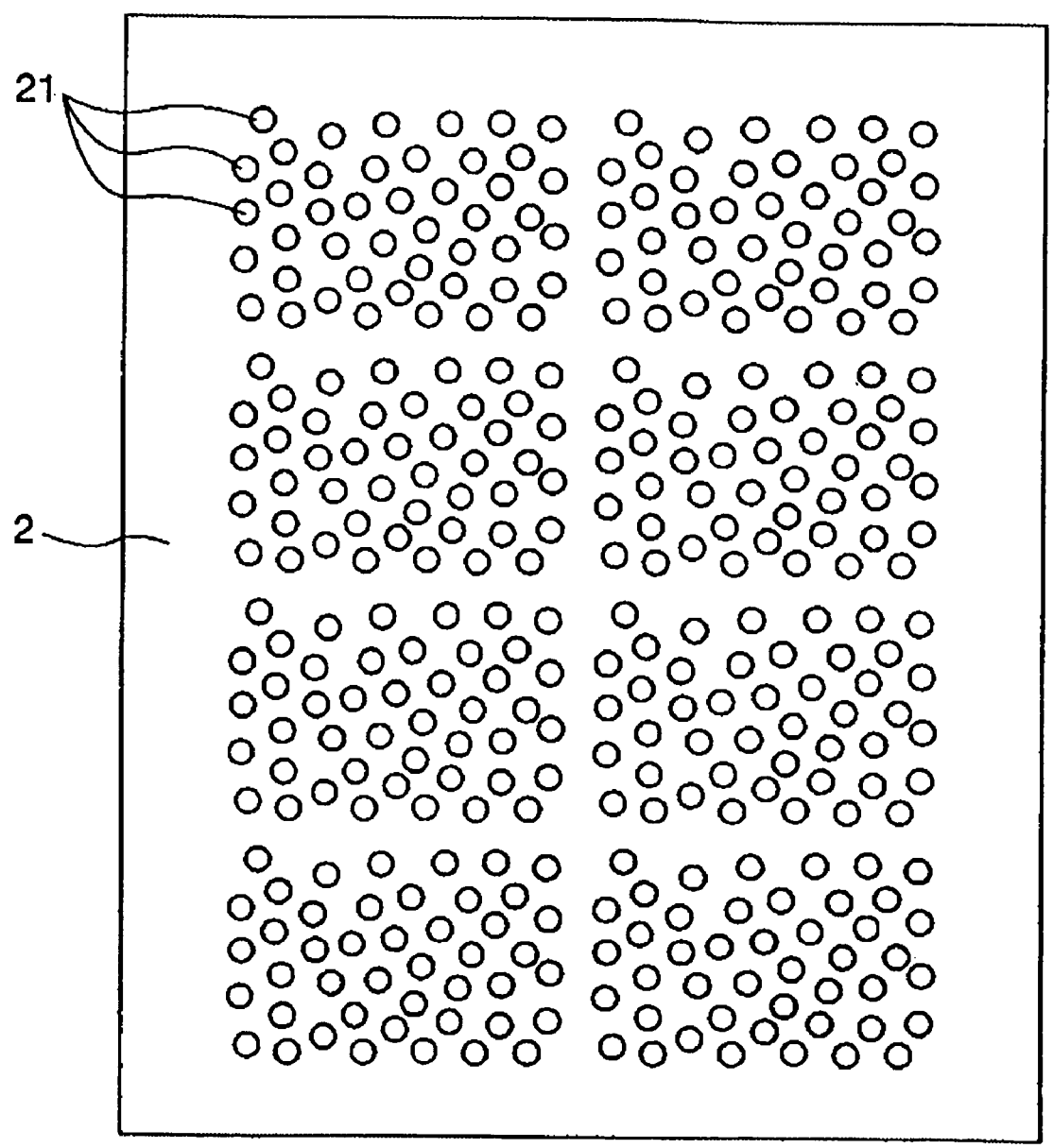
FIG. 2 is a plan view of the lens substrate shown in FIG. 1.

First, the configuration of a lens substrate of the invention will be described. FIG. 1 is a longitudinal cross-sectional view which schematically shows a lens substrate (microlens substrate) 1 in a first embodiment according to the invention. FIG. 2 is a plan view of the lens substrate 1 shown in FIG. 1. Now, in the following explanation using FIG. 1, for convenience of explanation, a left side and a right side in FIG. 1 are referred to as a "light incident side (or light incident surface)" and a "light emission side (or light emission surface)", respectively. In this regard, in the following description, a "light incident side" and a "light emission side" respectively indicate a "light incident side" and a "light emission side" of light for obtaining an image light, and they do not respectively indicate a "light incident side" and a "light emission side" of outside light or the like if not otherwise specified. Moreover, a part of the structure of the microlens substrate 1 such as a colored portion 22 (including a first region 221 and a second region 222), an easily colored portion (including a first easily colored portion 25 and a second easily colored portion 26), and a black matrix (light shielding layer) 3 are shown in the appending drawings so as to be emphasized. Such portions do not show actual dimensions (sizes).

The microlens substrate (lens substrate) 1 is a member that is included in a transmission screen 10 described later. As shown in FIG. 1, the microlens substrate 1 has a main substrate 2 provided with a plurality of microlenses (convex lenses) 21 at light incident surface thereof. Further, the colored portion (outside light absorbing portion) 22 is provided on the light incident surface of the microlens substrate 1 (that is, a light incident side of each of the microlenses 21). The colored portion 22 is constituted from the first region 221 having a predetermined content by percentage of the coloring agent which is provided on the first surface of the lens substrate, and the second region 222 having content by percentage higher than that of the first region 221 which is provided on the first region 221 at the light incident side of the microlens substrate 1 (that is, an external surface side of the microlens substrate 1). The function of the colored portion 22 (including the first region 221 and the second region 222) will be described later.

Further, for example, polystyrene beads, glass beads, organic cross-linked polymer, or the like may be included in the main substrate 2 as a diffusing material in order to diffuse the incident light from a light source if needed. In this regard, such a diffusing material may be included in the whole of the resin (that is, the whole of the main substrate 2), or in only a part of the resin. Moreover, a black matrix 3 may be provided on the light emission surface of the microlens substrate 1 as a light shielding layer if needed. FIG. 1 shows a state where the microlens substrate 1 is provided with the black matrix 3 on the light emission surface thereof.

The constituent material of the main substrate 2 is not particularly limited, but the main substrate 2 is composed of a resin material (that normally has a predetermined index of refraction of light larger than that of the air) as a main material. The resin material is a transparent material having an even index of refraction.

As for the concrete constituent material of the main substrate 2 (that normally has a predetermined index of refraction of light larger than that of the air), for example, polyolefin such as polyethylene, polypropylene, ethylene-propylene copolymer, ethylene-vinyl acetate copolymer (EVA) and the like, cyclic polyolefin, denatured polyolefin, polyvinyl chloride, polyvinylidene chloride, polystyrene, polyamide (such as nylon 6, nylon 46, nylon 66, nylon 610, nylon 612, nylon 11, nylon 12, nylon 6-12, nylon 6-66), polyimide, polyamide-imide, polycarbonate (PC), poly-(4-methylpentene-1), ionomer, acrylic resin, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, liquid crystal polymer such as aromatic polyester, fluoro resins such as polytetrafluoroethylene (PTFE), polyfluorovinylidene and the like, various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like, epoxy resins, phenolic resins, urea resins, melamine resins, unsaturated polyester, silicone based resins, urethane based resins, and the like; and copolymers, blended bodies and polymer alloys and the like having at least one of these materials as a main ingredient may be mentioned. Further, in this invention, a mixture of two or more kinds of these materials may be utilized (for example, a blended resin, a polymer alloy, a laminate body comprised of two or more layers using two or more of the materials mentioned above). Among these materials, from viewpoint of transparency, it is preferable that the constituent material of the main substrate 2 is any one of polystyrene, polycarbonate, polyethylene terephthalate, and an acrylic based resin, and more preferably it is an acrylic based resin, in particular. Since the acrylic based resin has excellent heat resistance, light resistance and workability, dimensional accuracy and mechanical strength when it is formed in addition to excellent transparency, the acrylic based resin is suitable for a constituent material of the lens substrate. However, in a conventional coloring method, it is difficult to color the surface of the lens substrate. On the other hand, in the invention, it is possible to form the colored portion even on the main substrate formed of the acrylic based resin having such a hardly-colored characteristic (in particular, hardly-stained characteristic). Therefore, by using the main substrate formed of the acrylic based resin as a main material in the invention, it is possible to provide a lens substrate (microlens substrate 1) having excellent various characteristics and reliability, in particular.

As for the acrylic based resin, for example, acrylic resin including acrylic acid or an inducer thereof (for example, acrylic ester) as a constituent monomer, methacrylic resin including methacrylic acid or an inducer thereof (for example, methacrylic acid ester) as a constituent monomer, copolymer including acrylic (methacrylic) acid or an inductor thereof as a constituent monomer such as styrene-acrylic ester copolymer, styrene-methacrylic acid ester copolymer, styrene-acrylic ester-methacrylic acid ester copolymer, styrene-α-chloro acrylic methyl copolymer, styrene-acrylonitrile-acrylic ester copolymer, and the like may be mentioned. One kind of them or a combination of two or more kinds selected from them may be utilized.

It is preferable that the diameter of the microlenses 21 is in the range of 10 to 500 μm, and more preferably it is in the range of 30 to 300 μm, and further more preferably it is in the range of 50 to 100 μm. By restricting the diameter of the microlenses 21 in the above ranges, it is possible to further enhance the productivity of the microlens substrate 1 (transmission screen 10 provided with the microlens substrate 1) while maintaining sufficient resolution in the image projected on the screen. In this regard, it is preferable that the pitch between adjacent microlenses 21 in the microlens substrate 1 is in the range of 10 to 500 μm, more preferably the pitch is in the range of 30 to 300 μm, and further more preferably the pitch is in the range of 50 to 100 μm.

Further, it is preferable that the radius of curvature of each of the plurality of microlenses 21 is in the range of 5 to 250 μm, and more preferably it is in the range of 15 to 150 μm. Most preferably it is in the range of 25 to 50 μm. By restricting the radius of curvature of each of the microlenses 21 in the above ranges, it is possible to particularly improve the angle of view characteristics. In particular, it is possible to improve the angle of view characteristics in the horizontal direction and the vertical direction.

Moreover, an arrangement pattern of the microlenses 21 is not particularly limited. The arrangement pattern may be either an arrangement pattern in which the microlenses 21 are arranged in a regular manner (for example, a lattice-shaped manner, honeycomb-shaped manner, houndstooth check manner) or an arrangement pattern in which the microlenses 21 are arranged in an optically random manner (the microlenses 21 are randomly arranged with each other when viewed from above the light incident surface (one major surface) of the microlens substrate 1). However, it is preferable that the microlenses 21 are arranged in a random manner as shown in FIG. 2. In the case where the microlenses 21 are arranged in such a random manner, it is possible to prevent interference of the light to a light valve of a liquid crystal or the like and a Fresnel lens from occurring more efficiently, and therefore it is possible to prevent moire from occurring almost completely. This makes it possible to obtain an excellent transmission screen 10 having a high display quality. In this regard, a term "in an optically random order" in the specification means that a plurality of microlenses 21 are arranged irregularly or at random so that it is possible to prevent and suppress occurrence of optical interference such as moire sufficiently.

Furthermore, each of the microlenses 21 is formed as a convex lens which protrudes toward the light incident side, and is designed so that the focal point f thereof is positioned in the vicinity of the light emission surface of the microlens substrate 1. In other words, parallel light La that enters the microlens substrate 1 from a direction substantially perpendicular to the microlens substrate 1 (parallel light La from a Fresnel lens 5 described later) is condensed by each of the microlenses 21 of the microlens substrate 1, and is focused on the focal point f in the vicinity of the light emission surface of the microlens substrate 1. At this time, by forming the black matrix 3 so that the vicinity of the focal point f is opened, it is possible to enhance the light use efficiency of the microlens substrate 1 further.

Further, it is preferable that the ratio of an area (projected area) occupied by all the microlenses (convex lenses) 21 in a usable area where the microlenses 21 are formed with respect to the entire usable area is 90% or more when viewed from above the light incident surface of the microlens substrate 1 (that is, a direction shown in FIG. 2). More preferably the ratio is 96% or more. In the case where the ratio of the area occupied by all the microlenses (convex lenses) 21 in the usable area with respect to the entire usable area is 90% or more, it is possible to reduce straight light passing through an area other than the area where the microlenses 21 reside, and this makes it possible to enhance the light use efficiency of the transmission screen 10 provided with the microlens substrate 1 further.

Further, as described above, the colored portion 22 is provided on the light incident surface of the microlens substrate 1 (that is, on the light incident side of each of the microlenses 21). The light entering the microlens substrate 1 from the light incident surface thereof can penetrate such a colored portion 22 efficiently, and the colored portion 22 has a function of preventing outside light from being reflected to the light emission side of the microlens substrate 1. By providing such a colored portion 22, it is possible to obtain a projected image having excellent contrast. On the other hand, the inventor found that such effects cannot be exerted sufficiently in the case where a colored portion 22 is provided at the light emission side of the lens substrate (that is, the light emission side of each of the microlenses 21). In other words, in the case of providing the colored portion 22 having the same color density at the light emission side of the lens substrate, light transmission from the light incident side is made to lower significantly, and it is impossible to prevent the outside light from being reflected sufficiently. It is thought that this is because a difference between attenuation of the outside light due to reflection and/or refraction thereof within the colored portion 22 in the case where the colored portion 22 is provided on the lens surface (that is, the light incident surface of the microlens substrate 1 on which the plurality of microlenses 21 are formed) and that in the case where the colored portion 22 is provided on the surface (flat surface) opposite to the lens surface is generated due to a difference between the surface areas of the colored portion 22 (colored volume) in both surfaces of the microlens substrate 1.

Further, in particular, the invention has a feature that the colored portion 22 is constituted from a plurality of regions (a first region 221 and a second region 222 in the present embodiment) each having a different content by percentage of a coloring agent. Thus, it is possible to heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof surely. As a result, it is possible to provide the microlens substrate 1 having excellent light transmission and to obtain the projected image having excellent contrast. In this way, the invention has a feature that, since the microlens substrate 1 is provided with the colored portion 22 constructed from the plurality of regions each having a different content by percentage of a coloring agent, it is possible to make the incident light entering the microlens substrate 1 from the light incident side penetrate through the microlens substrate 1 sufficiently, and to prevent the outside light from being reflected to the light emission side of the microlens substrate 1 efficiently.

As described above, the colored portion 22 may be any one as long as it is provided with the plurality of regions each having a different content by percentage of a coloring agent. In the present embodiment, the colored portion 22 has a first region (first layer) 221 provided on the light incident surface of the microlens substrate 1 and having a predetermined content by percentage of the coloring agent, and a second region (second layer) 222 provided on the first region 221, that is, at the light incident side of the microlens substrate 1 farther than the first region 221 and having content by percentage higher than that of the first region 221. Namely, in the case where the content by percentage of the coloring agent in the first region 221 is defined as $X_1$ (% by weight) and the content by percentage of the coloring agent in the second region 222 is defined as $X_2$ (% by weight), then $X_1$ and $X_2$ satisfy the relation of $X_1<X_2$. In this way, since the region having a higher content by percentage of the coloring agent (the second region) is provided at the light incident side of the microlens substrate 1 farther than the region having a lower content by percentage of the coloring agent (the first region 221, in this regard, not including zero), the effects as described above appear remarkably, in particular.

Moreover, the first and second regions 221, 222 are laminated in the thickness direction of the colored portion 22. In this way, since the colored portion 22 is constructed from a laminated structure including the plurality of layers each having a different content by percentage of the coloring agent, it is possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

The first layer 221 may be any one as long as it contains the coloring agent. Further, the average thickness of the first layer 221 varies depending upon the contents by percentage of the coloring agent in the first and second layers 221, 222, the thickness of the second layer 222, or the like. It is preferable that the average thickness of the first layer 221 is in the range of 1 to 10 μm, and more preferably it is in the range of 2 to 8 μm. In the case where the thickness of the first layer 221 is restricted within the above ranges, it is possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

Moreover, the average thickness of the second layer 222 varies depending upon the contents by percentage of the coloring agent in the first and second layers 221, 222, the thickness of the first layer 221, or the like. It is preferable that the average thickness of the second layer 222 is in the range of 0.05 to 8 μm, and more preferably it is in the range of 0.1 to 5 μm. In the case where the thickness of the second layer 222 is restricted within the above ranges, it is possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

Furthermore, in the case where the content by percentage of the coloring agent in the first region 221 is defined as $X_1$ (% by weight) and the content by percentage of the coloring agent in the second region 222 is defined as $X_2$ (% by weight), then it is preferable that $X_1$ and $X_2$ satisfy the relation: $0.0015 \leq X_1/X_2 \leq 0.95$. More preferably $X_1$ and $X_2$ satisfy the relation: $0.02 \leq X_1/X_2 \leq 0.90$, and further more preferably $X_1$ and $X_2$ satisfy the relation: $0.03 \leq X_1/X_2 \leq 0.80$. In the case where they satisfy such relations, it is possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

Further, in the case where the thickness of the first region 221 is defined as $D_1$ (μm) and the thickness of the second region 222 is defined as $D_2$ (μm), then it is preferable that $D_1$ and $D_2$ satisfy the relation: $0.1 \leq D_1/D_2 \leq 80$. More preferably $D_1$ and $D_2$ satisfy the relation: $0.2 \leq D_1/D_2 \leq 60$, further more preferably $D_1$ and $D_2$ satisfy the relation: $0.2 \leq D_1/D_2 \leq 50$. In the case where they satisfy such relations, it is possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

The thickness of the colored layer 22 is not particularly limited. It is preferable that the thickness of the colored layer 22 is in the range of 1 to 10 μm, more preferably it is in the range of 2 to 8 μm, and further more preferably it is in the range of 3 to 6 μm. In the case where the thickness of the colored portion 22 is restricted within the above ranges, it is possible to improve the contract of the image formed by the light penetrating the microlens substrate 1 particularly. On the other hand, in the case where the thickness of the colored portion 22 is below the lower limit given above, it is difficult to prevent the outside light (that is, outside light entering the microlens substrate 1 from the side opposite to the light incident side) from being reflected sufficiently, and therefore there is a possibility that the effect to improve the contrast of the projected image cannot be obtained sufficiently. Further, in the case where the thickness of the colored portion 22 is over the upper limit given above, the light transmission of the incident light is lowered and the obtained image cannot have sufficient brightness. As a result, there is a possibility that the contrast of the image becomes insufficient.

The color of the colored portion 22 is not particularly limited. It is preferable that the color of the colored portion 22 is an achromatic color, particularly black as appearance using a coloring agent in which the color thereof is based on blue and red, brown or yellow is mixed therein. Further, it is preferable that light having specific wavelengths for controlling balance of light's three primary colors (RGB) of a light source is selectively absorbed in the colored portion 22 or penetrates the colored portion 22. This makes it possible to prevent the outside light from being reflected. The tone of color of the image formed from the light penetrating the microlens substrate 1 can be expressed exactly, and chromatic coordinate is widened (the width of expression of the tone of color is made to widen sufficiently), and therefore a darker black can be expressed. As a result, it is possible to improve the contrast of the image, in particular.

The colored portion 22 may be formed by any forming method. In the present embodiment, as described later in detail, the colored portion 22 is formed by supplying a coloring liquid onto the main substrate 2. More specifically, the colored portion 22 is formed by supplying the coloring liquid thereon after subjecting the main substrate 2 to a process using a process liquid having special composition, and impregnating the inside of the main substrate 2 (microlenses 21) with the colored agent. This makes it possible to heighten adhesion of the colored portion 22 compared with the case where the colored portion 22 is stacked on the main substrate 2 (that is, externally provided). As a result, it is possible to prevent harmful influences to optical characteristics of the microlens substrate 1 such as change of an index of refraction in the vicinity of the interface between the main substrate 2 and the colored portion 22 from being generated more surely. Further, since the colored portion 22 is formed by supplying a process liquid and a coloring liquid (described later in detail) onto the main substrate 2, it is possible to reduce variation of the thickness of the colored portion 22 (in particular, variation of the thickness that does not correspond to the surface shape of the main substrate 2). This makes it possible to prevent troubles such as color heterogeneity from being generated in the projected image more surely.

Further, the colored portion 22 is constituted from a material containing the coloring agent, but the main component thereof is normally the same as that of the main substrate 2 (microlenses 21). Therefore, it is difficult to generate a drastic change of the index of refraction in the vicinity of the boundary between the colored portion 22 and other non-colored portions. As a result, it is possible to design the optical characteristics of the microlens substrate 1 as a whole easily, and therefore, it is possible to stabilize the optical characteristics of the microlens substrate 1 and to heighten reliability of the microlens substrate 1.

Moreover, a black matrix 3 may be provided on the light emission surface of the microlens substrate 1. In this case, the black matrix 3 is constituted from a material having a light shielding effect and formed in a laminated manner. By providing such a black matrix 3, it is possible to absorb outside light (which is not preferable to from a projected image) in the black matrix 3, and therefore it is possible to improve the image projected on a screen which has excellent contrast further. In particular, by providing both the colored portion 22 as described above and the black matrix 3, it is possible to enhance the contrast of the image projected by the microlens substrate 1. It is preferable that such a black matrix 3 is provided with a plurality of openings 31 on light path of the light penetrating each of the microlenses 21. Thus, the light condensed by each of the microlenses 21 can pass through the openings 31 of the black matrix 3 efficiently. As a result, it is possible to heighten the light use efficiency of the microlens substrate 1.

The size of each of the openings 31 is not particularly limited. It is preferable that the diameter of each of the openings 31 is in the range of 9 to 500 μm. More preferably it is in the range of 9 to 450 μm, and further more preferably it is in the range of 20 to 90 μm. This makes it possible to improve the contrast of the image projected onto a screen. Further, it is preferable that the average thickness of the black matrix 3 is in the range of 0.01 to 5 μm. More preferably it is in the range of 0.01 to 3 μm, and further more preferably it is in the range of 0.03 to 1 μm. In the case where the average thickness of the black matrix 3 is restricted within the above ranges, it is possible to fulfill the function of the black matrix 3 more efficiently while preventing involuntary troubles such as separation and crack of the black matrix 3 more surely. For example, it is possible to improve the contrast of the image projected to a screen of a transmission screen 10 provided with the microlens substrate 1.

Further, it is preferable that a ratio of an area (projected area) occupied by the region of the black matrix 3 other than that of the openings 31 inside a usable area where the plurality of microlenses 21 are formed with respect to the usable area when viewed from the light incident surface side of the microlens substrate 1 (in a direction to face the main substrate 2 shown in FIG. 2) is in the range of 1 to 70%, and more preferably it is in the range of 1 to 50%. In the case where the ration of the area occupied by the black matrix 3 is restricted within the above ranges, it is possible to enhance the contrast of the image projected to a screen while making the light use efficiency heighten sufficiently.

Next, a transmission screen 10 provided with the microlens substrate 1 as described above will now be described.

Figure 3:
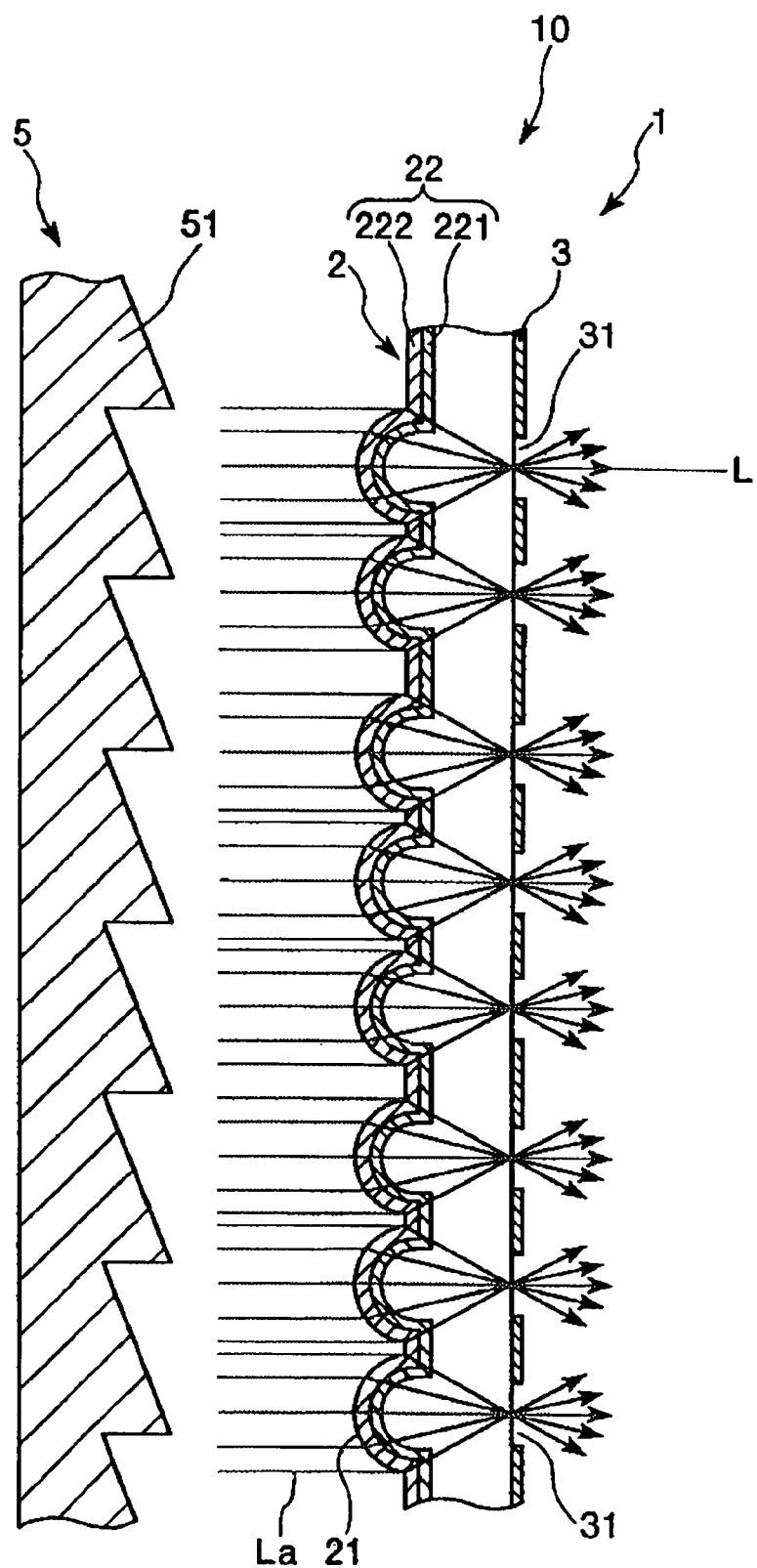
FIG. 3 is a longitudinal cross-sectional view which schematically shows a transmission screen provided with the lens substrate (microlens substrate) shown in FIG. 1 in a first embodiment according to the invention.

FIG. 3 is a longitudinal cross-sectional view which schematically shows a transmission screen 10 provided with the lens substrate (microlens substrate) 1 shown in FIG. 1 in a preferred embodiment according to the invention. As shown in FIG. 3, the transmission screen 10 is provided with a Fresnel lens 5 and the microlens substrate 1 described above. The Fresnel lens 5 is arranged on the side of the light incident surface of the microlens substrate 1 (that is, on the incident side of light for an image), and the transmission screen 10 is constructed so that the light that has been transmitted by the Fresnel lens 5 enters the microlens substrate 1.

The Fresnel lens 5 is provided with a plurality of prisms that are formed on a light emission surface of the Fresnel lens 5 in a substantially concentric manner. The Fresnel lens 5 deflects the light for a projected image from a projection lens (not shown in the drawings), and outputs parallel light La that is parallel to the perpendicular direction of the major surface of the microlens substrate 1 to the side of the light incident surface of the microlens substrate 1.

In the transmission screen 10 constructed as described above, the light from the projection lens is deflected by the Fresnel lens 5 to become the parallel light La. Then, the parallel light La enters the microlens substrate 1 from the light incident surface on which the plurality of microlenses 21 are formed to be condensed by each of the microlenses 21 of the microlens substrate 1, and the condensed light then passes through the openings 31 of the black matrix (light shielding layer) 3. At this time, the light entering the microlens substrate 1 penetrates through the microlens substrate 1 with sufficient transmittance and the light penetrating the openings 31 is then diffused, whereby an observer (viewer) of the transmission screen 10 observes (watches) the as a flat image.

Next, an example of a method of manufacturing the microlens substrate 1 described above will now be described.

Figure 4:
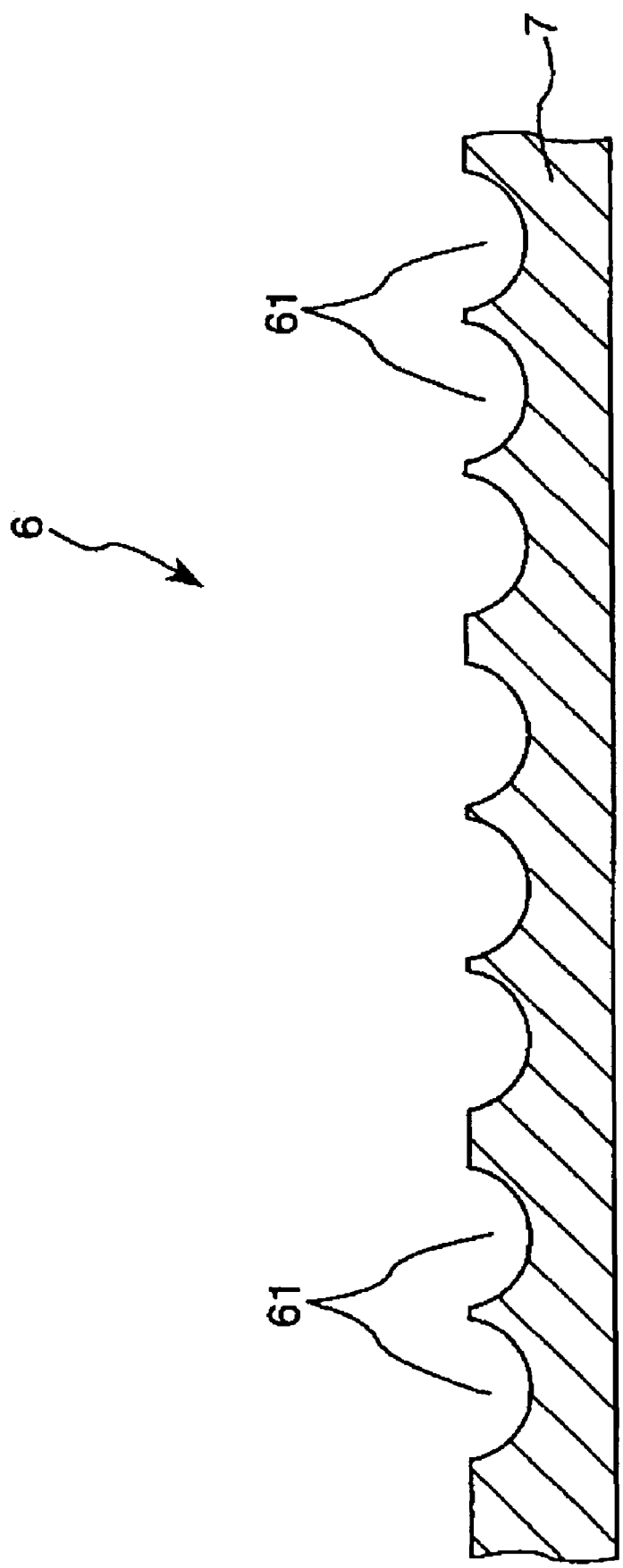
FIG. 4 is a longitudinal cross-sectional view which schematically shows a substrate with concave portions for forming microlenses with the use of manufacturing the microlens substrate.

FIG. 4 is a longitudinal cross-sectional view which schematically shows a substrate 6 with concave portions for forming microlenses 21 with the use of manufacturing the microlens substrate 1. FIG. 5 is a longitudinal cross-sectional view which schematically shows a method of manufacturing the substrate 6 with concave portions for forming microlenses 21 shown in FIG. 4. FIG. 6 is a longitudinal cross-sectional view which schematically shows an example of a method of manufacturing the lens substrate (microlens substrate 1) shown in FIG. 1. In this regard, in the following description, the lower side and upper side in FIG. 6 are referred to as a "light incident side (or light incident surface)" and a "light emission side (or light emission surface)", respectively.

Further, a large number of concave portions for forming microlenses 21 are actually formed on a substrate in manufacturing the substrate 6 with concave portions for forming microlenses 21, and a plurality of convex lenses are actually formed on a substrate in manufacturing the microlens substrate 1. However, in order to make the explanation understandable, a part of each of the substrate 6 with concave portions for forming microlenses 21 and the microlens substrate 1 is shown so as to be emphasized in FIGS. 4 to 6.

First, a structure of the substrate 6 with concave portions for forming microlenses 21 used to manufacture the microlens substrate 1 and a method of manufacturing the same, will be described prior to the description of a method of manufacturing the microlens substrate 1.

As shown in FIG. 4, a substrate 6 with concave portions for forming microlenses 21 has a plurality of concave portions (for forming microlenses 21) 61 arranged thereon in a random manner.

By using such a substrate 6 with concave portions for forming microlenses 21, it is possible to obtain a microlens substrate 1 on which a plurality of microlenses 21 are arranged in a random manner as described above. In this regard, a term "in an optically random order" in the specification means that a plurality of microlenses 21 are arranged irregularly or at random so that it is possible to prevent and suppress occurrence of optical interference such as moire sufficiently.

Next, the method of manufacturing the substrate 6 with concave portions for forming microlenses 21 will be described with reference to FIG. 5. In this regard, although a large number of concave portions for forming microlenses 21 are actually formed on the substrate, only a part of them will be exaggeratedly shown in order to simplify the explanation thereof.

First, a substrate 7 is prepared in manufacturing the substrate 6 with concave portions for forming microlenses 21. It is preferable that a substrate having a uniform thickness without flexure and blemishes is used for the substrate 7. Further, it is also preferable that a substrate with a surface cleaned by washing or the like is used for the substrate 7.

Although soda-lime glass, crystalline glass, quartz glass, lead glass, potassium glass, borosilicate glass, alkali-free glass or the like may be mentioned as for a constituent material for the substrate 7, soda-lime glass and crystalline glass (for example, neoceram or the like) are preferable among them. By the use of soda-lime glass, crystalline glass or alkali-free glass, it is easy to process the material for the substrate 7, and it is advantageous from the viewpoint of a manufacturing cost of the substrate 6 with concave portions for forming microlenses 21 because soda-lime glass or crystalline glass is relatively inexpensive.

Figure 5A:
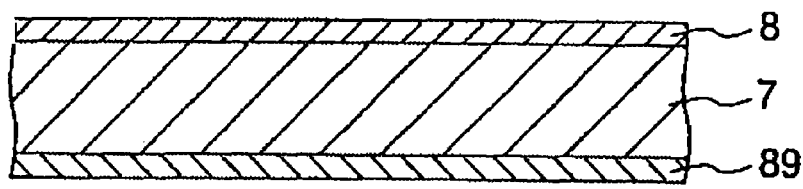
FIG. 5 is a longitudinal cross-sectional view which schematically shows a method of manufacturing the substrate with concave portions for forming microlenses shown in FIG. 4.

<A1> As shown in FIG. 5A, a mask 8 is formed on the surface of the prepared substrate 7 (mask formation process). Then, a back surface protective film 89 is formed on the back surface of the substrate 7 (that is, the surface side opposite to the surface on which the mask 8 is formed). Needless to say, the mask 8 and the back surface protective film 89 may be formed simultaneously. It is preferable that the mask 8 permits initial holes 81 described later to be formed therein by means of irradiation with laser beams or the like, and has resistance to etching at an etching process (described later). In other words, it is preferable that the mask 8 is constituted so that an etching rate for the mask 8 is nearly equal to or smaller than that for the substrate 7.

From such a viewpoint, for example, metals such as Cr, Au, Ni, Ti, Pt, and the like, metal alloys containing two or more kinds of metals selected from these metals, oxides of these metals (metal oxides), silicon, resins, and the like may be mentioned as a constituent material for the mask 8. Alternatively, the mask 8 may be given to a laminated structure by a plurality of layers formed of different materials such as a Cr/Au or chromium oxide/Cr laminate.

The method of forming the mask 8 is not particularly limited. In the case where the mask 8 is constituted from any of metal materials (including metal alloys) such as Cr and Au or metal oxides such as chromium oxide, the mask 8 can be suitably formed by means of an evaporation method, a sputtering method, or the like, for example. On the other hand, in the case where the mask 8 is formed of silicon, the mask 8 can be suitably formed by means of a sputtering method, a CVD method, or the like, for example.

In the case where the mask 8 is formed of chromium oxide or chromium as a main material thereof, the initial holes 81 can be easily formed by an initial hole formation process (described later), and the substrate 7 can be protected at the etching process more surely. Further, in the case where the mask 8 is formed of chromium oxide or chromium as a main material thereof, a solution of ammonium hydrogen difluoride ($NH_4HF_2$), for example, may be used as an etchant at the etching process (described later). Since a solution containing ammonium hydrogen difluoride is not poison, it is possible to prevent its influence on human bodies during work and on the environment more surely.

Although the thickness of the mask 8 also varies depending upon the material constituting the mask 8, it is preferable that the thickness of the mask 8 is in the range of 0.01 to 2.0 μm, and more preferably it is in the range of 0.03 to 0.2 μm. If the thickness of the mask 8 is below the lower limit given above, there is a possibility to deform the shapes of the initial holes 81 formed at the initial hole formation process (described later). In addition, there is a possibility that sufficient protection for the masked portion of the substrate 7 cannot be obtained during a wet etching process at the etching step (described later). On the other hand, if the thickness of the mask 8 is over the upper limit given above, in addition to the difficulty in formation of the initial holes 81 that penetrate the mask 8 at the initial hole formation process (described later), there will be a case in which the mask 8 tends to be easily removed due to internal stress thereof depending upon the constituent material or the like of the mask 8.

The back surface protective film 89 is provided for protecting the back surface of the substrate 7 at the subsequent processes. Erosion, deterioration or the like of the back surface of the substrate 7 can be suitably prevented by means of the back surface protective film 89. Since the back surface protective film 89 is formed using the same material as the mask 8, it may be provided in a manner similar to the formation of the mask 8 simultaneously with the formation of the mask 8.

Figure 5B:
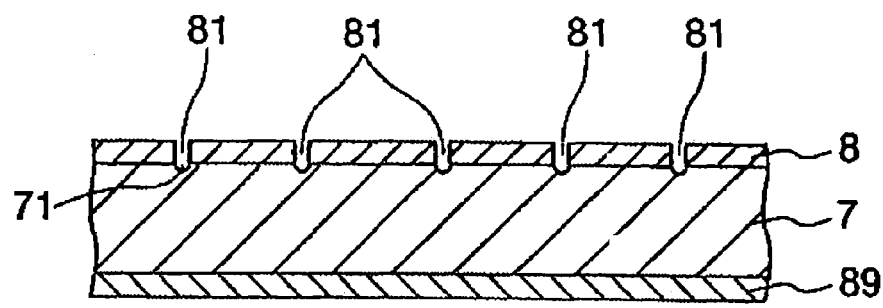

<A2> Next, as shown in FIG. 5B, the plurality of initial holes 81 that will be utilized as mask openings at the etching process (described later) are formed in the mask 8 in a random manner (initial hole formation process). The initial holes 81 may be formed in any method, but it is preferable that the initial holes 81 are formed by the physical method or the irradiation with laser beams. This makes it possible to manufacture the substrate 6 with concave portions for forming microlenses 21 at high productivity. In particular, the concave portions can be easily formed on a relatively large-sized substrate.

As for the physical methods of forming the initial holes 81, for example, blast processing such as shot blast, sand blast or the like, etching, pressing, dot printing, tapping, rubbing, or the like may be mentioned. In the case where the initial holes 81 are formed by means of the blast processing, it is possible to form the initial holes 81 for a shorter time efficiently even on the substrate 7 with a relatively large area (that is, an area of the region where the microlenses 21 are to be formed).

Further, in the case where the initial holes 81 are formed by means of the irradiation with laser beams, the kind of laser beam to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like may be mentioned. Moreover, a waveform of a laser such as SHG (second-harmonic generation), THG (third-harmonic generation), FHG (fourth-harmonic generation) or the like may be utilized. In the case where the initial holes 81 are formed by means of the irradiation of laser beams, it is possible to easily and precisely control the size of the initial holes 81, distance between adjacent initial holes 81, or the like. Furthermore, in the case where the initial holes 81 are formed by the irradiation with laser beams, by controlling irradiation conditions for the laser beams, it is possible not only to form the initial holes 81 without forming initial concave portions 71 described later, but also to form the initial concave portions 71 having a little variation in shapes, sizes and depths thereof as well as those of initial holes 81 easily and surely.

It is preferable that the initial holes 81 are formed uniformly on the entire surface of the mask 8. Further, it is preferable that the initial holes 81 are formed in such a manner in which small holes are arranged at predetermined regular intervals so that there is no flat portion on the surface of the substrate 7 to be formed, and so that the surface of the substrate 7 is covered with concave portions 81 with almost no space when subjecting the substrate 7 with the mask 8 to an etching process at step <A3> (described later).

More specifically, for example, it is preferable that the shape of each of the formed initial holes 81 when viewed from above one major surface of the substrate 7 on which the mask 8 has been formed is a substantially circular shape and each of the initial holes 81 has the average diameter in the range of 2 to 10 μm. Furthermore, it is preferable that the initial holes 81 are formed on the mask 8 at the rate of 1,000 to 1,000,000 holes per square centimeter ($cm^2$), and more preferably they are formed at the rate of 10,000 to 500,000 holes per square centimeter ($cm^2$). In this regard, needless to say, the shape of each of the initial holes 81 is not limited to the substantially circular shape.

When the initial holes 81 are formed in the mask 8, as shown in FIG. 5B, the initial concave portions 71 may also be formed in the substrate 7 by removing parts of the surface of the substrate 7 in addition to the initial holes 81. This makes it possible to increase contact area of the substrate 7 with the etchant when subjecting the substrate 7 with the mask 8 to the etching process (described later), whereby erosion can be started suitably. Further, by adjusting the depth of each of the initial concave portions 71, it is also possible to adjust the depth of the concave portions 61 (that is, the maximum thickness of the lens (microlens 21)). Although the depth of each of the initial concave portions 71 is not particularly limited, it is preferable that it is 5.0 μm or less, and more preferably it is in the range of about 0.1 to 0.5 μm. In the case where the formation of the initial holes 81 is carried out by means of the irradiation with laser beams, it is possible to surely reduce variation in the depth of each of the plurality of initial concave portions 71 formed together with the initial holes 81. This makes it possible to reduce variation in the depth of each of the concave portions 61 constituting a substrate 6 with concave portions for forming microlenses 21, and therefore it is possible to reduce variation in the size and shape of each of the microlenses 21 in the microlens substrate 1 obtained finally. As a result, it is possible to reduce variation in the diameter, the focal distance, and the thickness of the lens of each of the microlenses 21, in particular.

Further, other than by means of the physical method or the irradiation with laser beams, the initial holes 81 may be formed in the formed mask 8 by, for example, previously arranging foreign objects on the substrate 7 with a predetermined pattern when the mask 8 is formed on the substrate 7, and then forming the mask 8 on the substrate 7 with the foreign objects to form defects in the mask 8 by design so that the defects are utilized as the initial holes 81.

In this way, in the invention, by forming the initial holes 81 in the mask 8 by means of the physical method or the irradiation with laser beams, it is possible to form openings (initial holes 81) in the mask 8 in a random manner easily and inexpensively compared with the formation of the openings in the mask 8 by means of a conventional photolithography method. Further, according to the physical method or the irradiation with laser beams, it is possible to deal with a large-sized substrate easily.

Figure 5C:
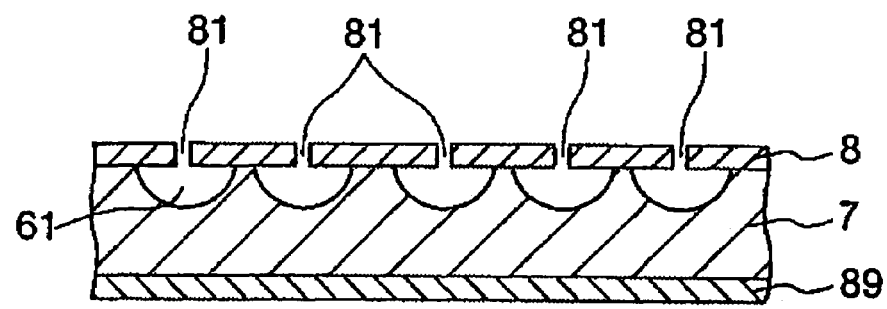

<A3> Next, as shown in FIG. 5C, a large number of concave portions 61 are formed in the substrate 7 in a random manner by subjecting the substrate 7 to the etching process using the mask 8 in which the initial holes 81 are formed (etching process). The etching method is not particularly limited, and as for the etching method, a wet etching process, a dry etching process and the like may be mentioned, for example. In the following explanation, the case of using the wet etching process will be described as an example.

By subjecting the substrate 7 covered with the mask 8 in which the initial holes 81 are formed to the wet etching process, as shown in FIG. 5C, the substrate 7 is eroded from the portions where no mask 8 is present, whereby a large number of concave portions 61 are formed in the substrate 7. As mentioned above, since the initial holes 81 formed in the mask 8 are arranged in a random manner, the concave portions 61 to be formed are also arranged on the surface of the substrate 7 in a random manner.

Further, in the present embodiment, the initial concave portions 71 are formed on the surface of the substrate 7 when the initial holes 81 are formed in the mask 8 at step <A2>. This makes the contact area of the substrate 7 with the etchant increase during the etching process, whereby erosion can be made to start suitably. Moreover, the concave portions 61 can be formed suitably by employing the wet etching process. In the case where an etchant containing hydrofluoric acid (hydrogen fluoride) (that is, hydrofluoric acid-based etchant) is utilized for an etchant, for example, the substrate 7 can be eroded more selectively, and this makes it possible to form the concave portions 61 suitably.

In the case where the mask 8 is mainly constituted from chromium (that is, the mask 8 is formed of a material containing Cr as a main material thereof), a solution of ammonium hydrogen difluoride is particularly suited as a hydrofluoric acid-based etchant. Since a solution containing ammonium hydrogen difluoride (4% by weight or less aqueous solution thereof) is not poison, it is possible to prevent its influence on human bodies during work and on the environment more surely. Further, in the case where the solution of ammonium hydrogen difluoride is used as an etchant, for example, hydrogen peroxide may be contained in the etchant. This makes it possible to accelerate the etching speed.

Further, the wet etching process can be carried out with simpler equipment than that in the dry etching process, and it allows the processing for a larger number of substrates 7 at a time. This makes it possible to enhance productivity of the substrates 6, and it is possible to provide the substrate 6 with concave portions for forming microlenses 21 at a lower cost.

Figure 5D:
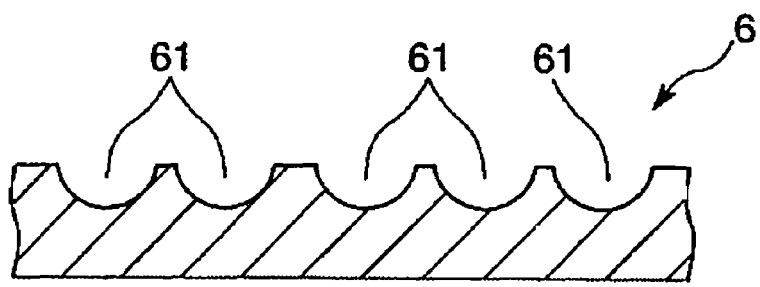

<A4> Next, the mask 8 is removed as shown in FIG. 5D (mask removal process). At this time, the back surface protective film 89 is also removed along with the mask 8. In the case where the mask 8 is constituted from chromium as a main material thereof, the removal of the mask 8 can be carried out by means of an etching process using a mixture of ceric ammonium nitrate and perchloric acid, for example.

As a result of the processing in the above, as shown in FIGS. 5D and 4, a substrate 6 with concave portions for forming microlenses 21 in which a large number of concave portions 61 are formed in the substrate 7 in a random manner is obtained.

The method of forming the plurality of concave portions 61 in the substrate 7 in a random manner is not particularly limited. In the case where the concave portions 61 are formed by means of the method mentioned above, that is, the method of forming the concave portions 61 in the substrate 7 by forming the initial holes 81 in the mask 8 by means of the physical method or the irradiation with laser beams and then subjecting the substrate 7 to the etching process using the mask 8, it is possible to obtain the following effects.

Namely, by forming the initial holes 81 in the mask 8 by means of the physical method or the irradiation with laser beams, it is possible to form openings (initial holes 81) in a predetermined pattern in the mask 8 easily and inexpensively compared with the case of forming the openings in the mask 8 by means of the conventional photolithography method. This makes it possible to enhance productivity of the substrate 6 with concave portions for forming microlenses 21, whereby it is possible to provide the substrate 6 with concave portions for forming microlenses 21 at a lower cost.

Further, according to the method as described above, it is possible to carry out the processing for a large-sized substrate easily. Also, according to the method, in the case of manufacturing such a large-sized substrate, there is no need to bond a plurality of substrates as the conventional method, whereby it is possible to eliminate the appearance of seams of bonding. This makes it possible to manufacture a high quality large-sized substrate 6 with concave portions for forming microlenses 21 (that is, microlens substrate 1) by means of a simple method at a low cost.

Moreover, after the mask 8 is removed at step <A4>, a new mask may be formed on the substrate 7, and then a series of processes including the mask formation process, the initial hole formation process, the wet etching process and the mask removal process may be repeated. This makes it possible to obtain the substrate 6 with concave portions for forming microlenses 21 in which the concave portions 61 are formed densely.

Next, the method of manufacturing the microlens substrate 1 using the substrate 6 with concave portions for forming microlenses 21 will now be described.

Figure 6A:
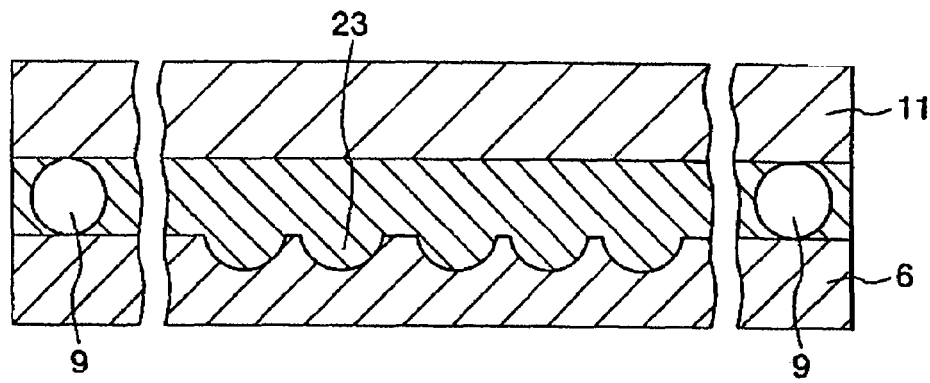
FIG. 6 is a longitudinal cross-sectional view which schematically shows an example of a method of manufacturing the lens substrate (microlens substrate) shown in FIG. 1.

<B1> As shown in FIG. 6A, a resin 23 having fluidity (for example, a resin 23 at a softened state, a non-polymerized (uncured) resin 23) is supplied to the surface of the substrate 6 with concave portions for forming microlenses 21 on which the concave portions 61 are formed. In the present embodiment, at this step, the resin 23 is pressed (or pushed) by means of a flat plate 11 while spacers 9 are provided at a region where the concave portions 61 of the substrate 6 with concave portions for forming microlenses 21 are not formed. Thus, it is possible to control the thickness of the formed microlens substrate 1 more surely, and this makes it possible to control the focal points of the respective microlenses 21 in the microlens substrate 1 finally obtained more surely.

In the case where the spacers 9 are used as this embodiment, the shape of the spacer 9 is not particularly limited, but it is preferable that it is a substantially spherical shape or substantially cylindrical shape. Further, in the case where each of the spacers 9 has such a shape, it is preferable that the diameter of the spacer 9 is in the range of 10 to 300 μm, and more preferably it is in the range of 30 to 200 μm. Further more preferably, it is in the range of 30 to 170 μm.

In this regard, prior to the application of the resin 23 and the pushing process with the flat plate 11, a mold release agent or the like may be applied to the surface of the substrate 6 with concave portions for forming microlenses on which the concave portions 61 are formed or the surface of the flat plate 11 with which the resin 23 is in contact when pushing the resin 23. This makes it possible to separate the main substrate 2 from the substrate 6 with concave portions for forming microlenses 21 and the flat plate 11 easily and surely in the following steps.

Figure 6B:
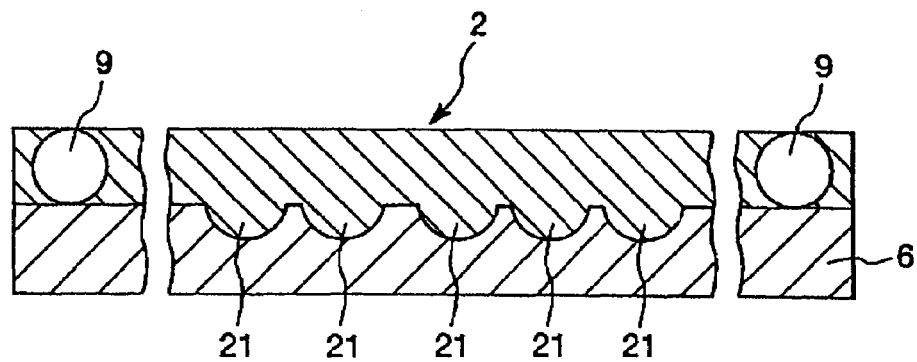

<B2> Next, the resin 23 is solidified (in this regard, including hardened (polymerized)), and then the flat plate 11 is removed (see FIG. 6B). In this way, the main substrate 2 provided with the plurality of microlenses 21 constituted from the resin 23 filled in the plurality of concave portions 61 each of which serves as a convex lens is obtained. In the case where the solidification of the resin 23 is carried out by being hardened (polymerized), the method thereof is not particularly limited, and it is appropriately selected according to the kind of the resin. For example, irradiation with light such as ultraviolet rays, heating, electron beam irradiation, or the like may be mentioned.

In this regard, in order to diffuse the incident light from a light source, for example, polystyrene beads, glass beads, organic cross-linked polymer or the like may be mixed as diffusion media in the resin 23 if needed. In this case, the diffusion media may be mixed in the whole of the resin 23, or may be mixed only in part of the resin 23. The amount of the diffusion media is not particularly limited. From the viewpoint of the angle of view characteristics, it is preferable that Haze (the degree of fog: Td/Tt, Td: transmittance of diffused light, Tt: transmittance of all light) is in the range of 30 to 99%, for example.

<B3> In this regard, a process that a black matrix 3 is formed on the light emission surface of the main substrate 2 manufactured as described above will be described.

Figure 6C:
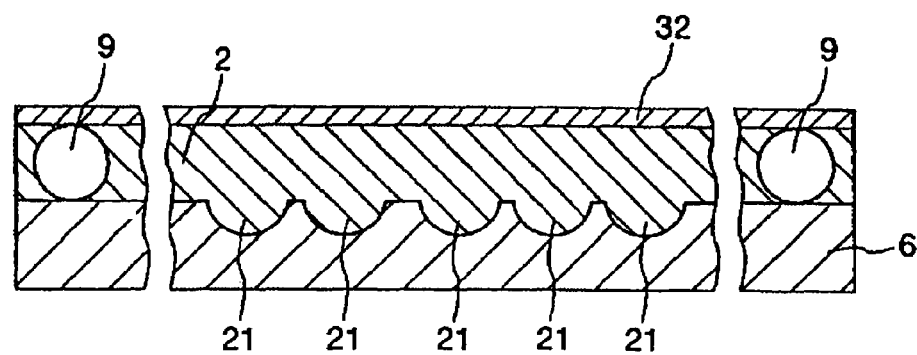

First, as shown in FIG. 6C, a positive photopolymer 32 having light shielding (blocking) effect is supplied onto the light emission surface of the main substrate 2. As the method of supplying the positive photopolymer 32 onto the light emission surface of the main substrate 2, for example, various types of coating methods such as a dip coat method, a doctor blade method, a spin coat method, a blush coat method, a spray coating, an electrostatic coating, an electrodeposition coating, roll coater, and the like can be utilized. The positive photopolymer 32 may be constituted from a resin having light shielding (blocking) effect, or may be one in which a material having light shielding (blocking) effect is dispersed or dissolved to a resin material having low light shielding (blocking) effect. Heat treatment such as a pre-bake process, for example, may be carried out after supplying the positive photopolymer 32 if needed.

Figure 6D:
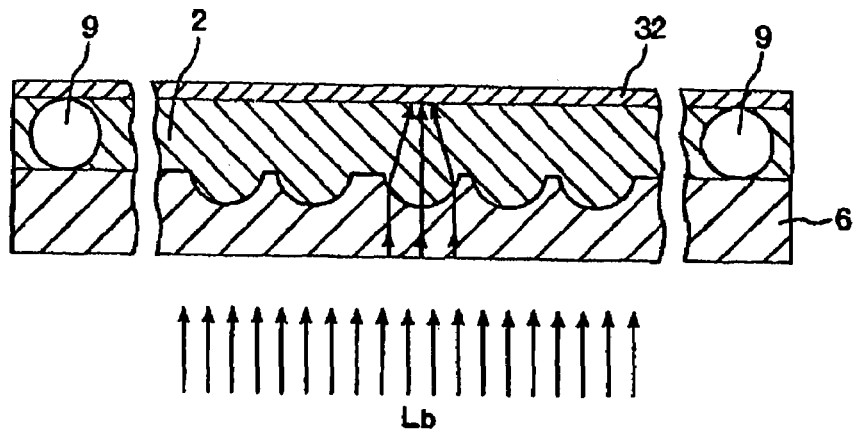

<B4> Next, as shown in FIG. 6D, light Lb for exposure is irradiated to the main substrate 2 in a direction perpendicular to the light incident surface of the main substrate 2. The irradiated light Lb for exposure is condensed by passing through each of the microlenses 21. The positive photopolymer 32 in the vicinity of the focal point f of each of the microlenses 21 is exposed, and the positive photopolymer 32 corresponding to portions other than the vicinity of the focal points f is not exposed or slightly exposed (that is, the degree of exposure is small). In this way, only the positive photopolymer 32 in the vicinity of the respective focal points f is exposed.

Figure 6E:
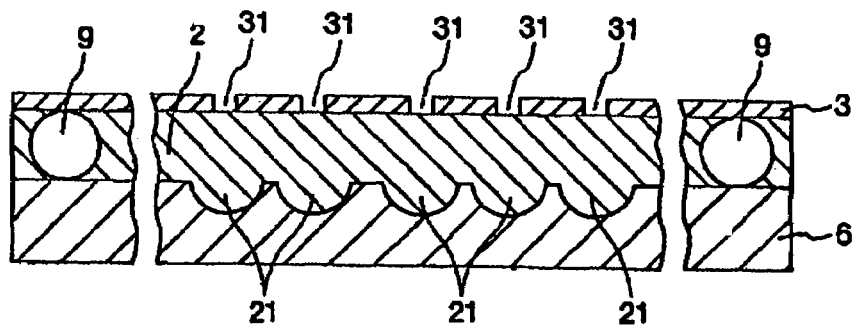

The development is then carried out. In this case, since the photopolymer 32 is a positive photopolymer, the exposed photopolymer 32 in the vicinity of the respective focal points f is melt and removed by the development. As a result, as shown in FIG. 6E, the black matrix 3 in which the openings 31 are formed on the portions corresponding to the optical axes L of the microlenses 22 is provided. The developing method may be selected arbitrarily depending on composition of the positive photopolymer 32 or the like. For example, the development of the positive photopolymer 32 in the present embodiment can be carried out using an alkaline aqueous solution such as a solution of potassium hydroxide or the like. Further, heat treatment such as a post-bake process may be carried out after exposing the positive photopolymer 32 if needed. In this regard, the black matrix 3 does not always have to be formed. In the case where the black matrix 3 is not formed, it is possible to omit the steps <B3> and <B4> described above.

Figure 6F:
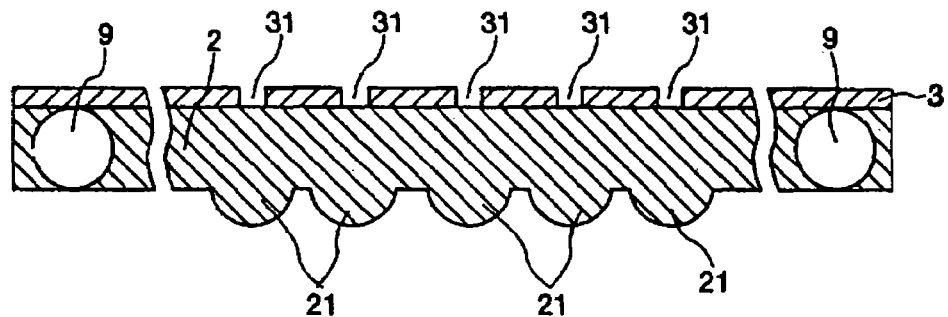

<B5> Next, the main substrate 2 is released from the substrate 6 with concave portions for forming microlenses 21 (see FIG. 6F). In this way, by removing the substrate 6 with concave portions for forming microlenses 21 from the main substrate 2, it is possible to use the substrate 6 with concave portions for forming microlenses 21 repeatedly when manufacturing the main substrate 2 (that is, microlens substrate 1), and this makes it possible to reduce the manufacturing costs for the main substrate 2, and to heighten the stability of quality of the main substrate 2 (microlens substrate 1) to be manufactured.

Figure 6G:
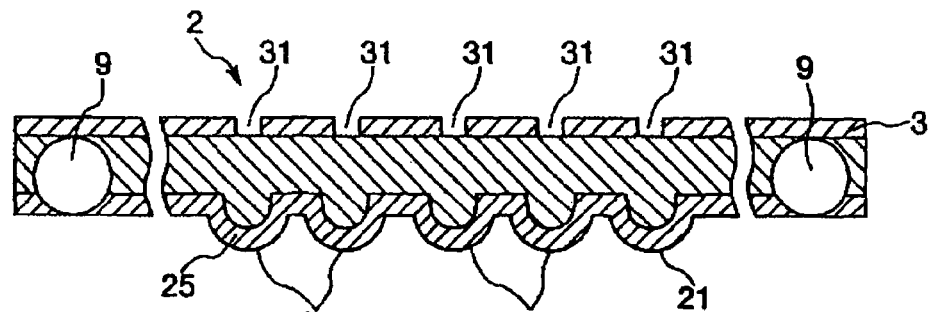
Figure 6H:
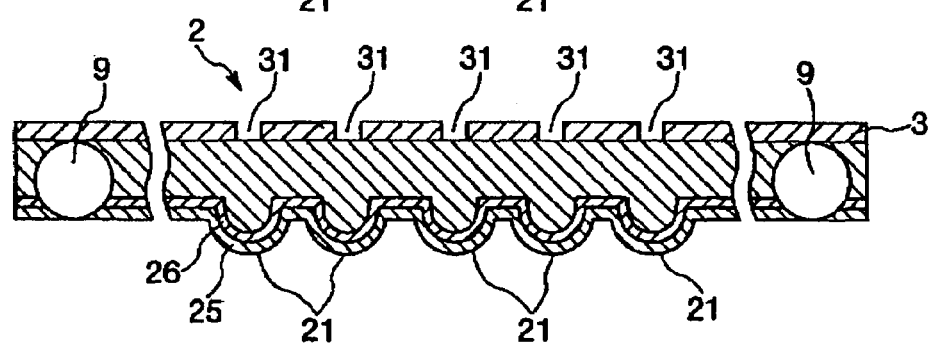
Figure 6I:
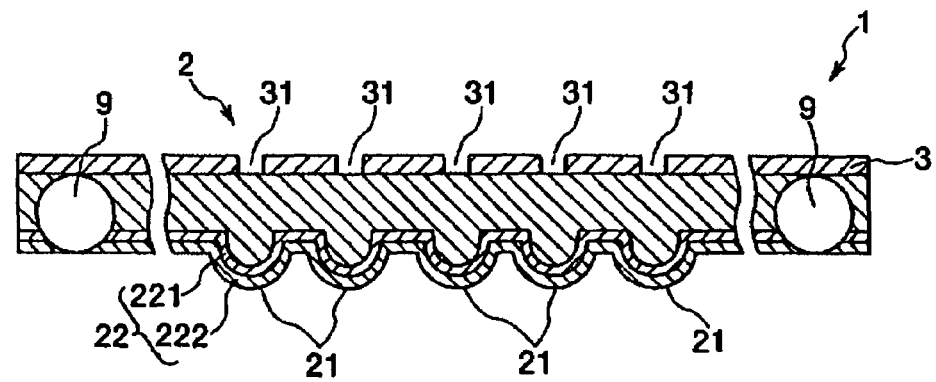

<B6> The main substrate 2 which has been released from the substrate 6 with concave portions for forming microlenses 21 is then subjected to a first process using a process liquid (first process liquid) containing benzyl alcohol, by which an easily colored portion (first easily colored portion 25) that is easily colored compared with other portion of the main substrate 2 is formed (see FIGS. 6G and 6H). Then, by carrying out a coloring process described later, a first coloring process to the first easily colored portion 25 is carried out. In this regard, additives other than benzyl alcohol may be contained in the first process liquid, or a colored agent may be contained in the first process liquid.

Next, the main substrate 2 in which the first easily colored portion 25 has been subjected to the first coloring process as described above is subjected to a second process using a process liquid (second process liquid) containing benzyl alcohol, by which an easily colored portion (second easily colored portion 26) that is easily colored compared with other portion of the main substrate 2 is formed (see FIGS. 6G and 6H). Then, by carrying out a coloring process described later, a second coloring process to the second easily colored portion 26 is carried out. In this regard, additives other than benzyl alcohol may be contained in the first process liquid, or a colored agent may be contained in the first process liquid. Further, the other additives and the coloring process will be described later.

In this way, the present inventor found that it is possible to carry out the coloring of the main substrate 2 easily and surely by respectively subjecting the main substrate 2 to the processes using the process liquid containing benzyl alcohol (first process liquid supplying step and second process liquid supplying step) prior to a coloring liquid supplying step described later (first coloring process and second coloring process). In particular, according to the processes, it is possible to subject a main substrate 2 formed of a material such as an acrylic based resin which it is difficult to color in a conventional coloring method to a coloring process easily and surely. It is thought that this is for the following reasons.

Namely, by using the process liquid containing benzyl alcohol, the benzyl alcohol in the process liquid penetrates the main substrate 2 deeply and diffuses therein, whereby the bonding of molecules (the bonding between the molecules) constituting the main substrate 2 is loosened, and spaces in which the coloring agent is to penetrate are secured. The coloring agent in the coloring liquid easily penetrates the main substrate 2 at a coloring liquid supplying step described later, by which the coloring agent is held in the spaces (which can be likened to seats for the coloring agent (coloring seats)), and therefore, the surface of the main substrate 2 is colored and the held coloring agent does not break away from the main substrate 2. In other words, the present step is a step for preparing the spaces in the main substrate 2 in advance so that the coloring agent in the coloring liquid can penetrate the main substrate 2 easily at the coloring liquid supplying step.

Further, by using the process liquid as described above, it is possible to form the colored portion 22 having an even thickness easily and surely. In particular, even though a main substrate (that is, work) to be colored is one in which a minute structure such as microlenses is provided on the surface thereof (one in which a cycle of unevenness in a two-dimensional direction of the surface thereof is small) or one in which the region to be colored is a large area, or even though there is a defect due to unevenness of polymerization of the resin, it is possible to form the colored portion 22 with even color density (that is, without unevenness of light transmission) because benzyl alcohol contained in the process liquid for processing in advance can loosen the bonding of molecules of the resin.

Moreover, by supplying the process liquid as described above onto the main substrate 2 prior to supplying the coloring liquid thereto, the following effects can be obtained. Namely, in the case of carrying out two-step coloring processes as described above, by setting the concentration of benzyl alcohol in the first process liquid arbitrarily, it is possible to control the depth and concentration of the colored portion (colored layers) at the subsequent coloring step with high accuracy, evenly and easily. For example, in the case where the colored portion is deeply colored with a high concentration of the coloring agent by means of the subsequent step, the concentration of benzyl alcohol in the first process liquid is set to higher. Further, in the case where the colored portion is lightly colored with a low concentration of the coloring agent by means of the subsequent step, the concentration of benzyl alcohol in the first process liquid is set to lower. On the other hand, in the case of directly coloring the colored portion 22 at one step as a conventional method, it is difficult to control the colored portion 22 delicately because both the step of securing the spaces for coloring and the step of coloring proceed substantially simultaneously. Moreover, by containing benzyl alcohol in the coloring agent at subsequent coloring step, it is possible to control the concentration of the colored portion 22 more easily. Namely, it has been already described that benzyl alcohol in the first process liquid secures the spaces (coloring seats) in which the coloring agent penetrates at the next coloring step. By carrying out this process (that is, control of the concentration and a process time) adequately, the spaces in which the coloring agent penetrates are secured sufficiently in advance, and by using the operation of benzyl alcohol at the next coloring step, it is possible to accelerate the penetration of the coloring agent into the spaces. This makes it possible to carry out the coloring step more efficiently with a short time. Furthermore, by changing the settings of the concentration of benzyl alcohol in the first process liquid and the concentration of benzyl alcohol at the next coloring step, it is possible to control the speed of diffusion of the coloring agent into the main substrate 2. As a result, it is possible to color the colored portion 22 evenly even onto a large area.

Furthermore, by changing the composition of each of the first process liquid and the second process liquid arbitrarily, it is possible to control the thickness and the concentration of each of colored regions (first easily colored portion 25 and second easily colored portion 26) at the first and second coloring processes freely. This makes it possible to particularly heighten light transmission that enters the microlens substrate 1 from the light incident surface thereof and exit from the light emission surface thereof sufficiently, and to prevent the outside light from having an influence on the projected image by attenuating the light (outside light) entering the microlens substrate 1 from the side opposite to the light incident side thereof more surely.

As the method of supplying the process liquid onto the light incident surface of the main substrate 2, for example, various types of coating methods such as a doctor blade method, a spin coat method, a blush coat method, a spray coating, an electrostatic coating, an electrodeposition coating, roll coater, and a dipping method in which the main substrate 2 is immersed (soaked) in the process liquid, and the like may be mentioned. The dipping method is suitable among these methods. This makes it possible to form the easily colored portion 25 (in particular, the easily colored portion 25 having even color density) easily and surely.

It is preferable that the process liquid supplying step is carried out while the process liquid and/or the main substrate 2 are heated at the range of 60 to 100° C. This makes it possible to accelerate the securement of the coloring seats by benzyl alcohol evenly even at a large area, and to further speed up the coloring speed, and therefore it is possible to form the easily colored portion 25 efficiently. Further, the process liquid supplying step may be carried out while the ambient pressure is heightened (with application of pressure). This makes it possible to accelerate the penetration of the process liquid into the inside of the main substrate 2, and as a result, it is possible to form the easily colored portion 25 efficiently with a short time.

The content by percentage of the benzyl alcohol in the process liquid is not particularly limited. It is preferable that the content by percentage of the benzyl alcohol is in the range of 0.01 to 10.0% by weight. More preferably it is in the range of 0.05 to 8.0% by weight, and further more preferably it is in the range of 0.1 to 5.0% by weight. In the case where the content by percentage of benzyl alcohol is restricted within the above ranges, it is possible to form the suitable easily colored portions (including the first easily colored portion 25 and the second easily colored portion 26) easily and surely while preventing a harmful influence (such as deterioration of the constituent material of the main substrate 2) on the main substrate 2 on which the respective easily colored portions (including the first easily colored portion 25 and the second easily colored portion 26) are to be formed from being generated more efficiently.

Further, as described above, additives other than benzyl alcohol may be contained in the process liquid. For example, at least one compound selected from a benzophenone based compound and a benzotriazole based compound may be contained in the process liquid. This makes it possible to fulfill the effects as described above more remarkably. For example, this makes it possible to carry out the coloring of the main substrate 2 easily and surely. In particular, according to the coloring processes, it is possible to subject a main substrate 2 formed of a material such as an acrylic based resin which it is difficult to color in a conventional coloring method to a coloring process easily and surely. It is thought that this is because, by using the at least one compound selected from the benzophenone based compound and the benzotriazole based compound and benzyl alcohol together, the at least one compound selected from the benzophenone based compound and the benzotriazole based compound interacts with benzyl alcohol in a complementary manner, and as a result, remarkable effects (synergistic effects) due to simultaneous use of them may be fulfilled (exerted).

To explain this mechanism in detail, benzyl alcohol in the process liquid first loosens the bonding of molecules in the resin of the main substrate 2, whereby the spaces in which other molecules penetrate are secured. Second, the at least one compound selected from the benzophenone based compound and the benzotriazole based compound deeply penetrates these spaces and diffuses therein. Each of the benzophenone based compound and the benzotriazole based compound has a function of loosening the bonding of molecules in the resin of the main substrate 2 and securing the spaces in which other molecules penetrate as well as benzyl alcohol. For this reason, by using the spaces secured by benzyl alcohol, each of the benzophenone based compound and the benzotriazole based compound operates to widen the spaces more deeply and more widely. In this regard, a coloring agent used at the subsequent coloring step does not have this function. The coloring agent penetrates the spaces thus secured at the next coloring step and are held therein, by which the coloring process is terminated. In this way, by using the at least one compound selected from the benzophenone based compound and the benzotriazole based compound and benzyl alcohol together, it is possible to diffuse the coloring agent into the main substrate 2 more deeply efficiently with a high speed, whereby it is possible to color the colored portion 22 (main substrate 2) evenly.

In this regard, benzyl alcohol, the benzophenone based compound and the benzotriazole based compound strongly function to secure the coloring seats described above, in particular. For this reason, it is possible to take the coloring agent in the main substrate 2 more efficiently. Further, by using the benzophenone based compound and/or the benzotriazole based compound together with benzyl alcohol, it is possible to form the easily colored portions (including the first easily colored portion 25 and the second easily colored portion 26) more surely even though the conditions to supply the process liquid are mild. As a result, it is possible to prevent a harmful influence (such as deterioration of the constituent material of the main substrate 2) on the main substrate 2 on which the respective easily colored portions (including the first easily colored portion 25 and the second easily colored portion 26) are to be formed from being generated more efficiently.

As for the benzophenone based compound, a compound shown in a chemical formula I or compounds having a benzophenone skeleton as shown in other canonical formula corresponding to the chemical formula I, these tautomers (hereinafter, referred to simply as "the compound having the benzophenone skeleton shown in the chemical formula I"), or these inductors (for example, addition reaction products, substitution reaction products, reductive reaction products, oxidation reaction products and the like) can be utilized.

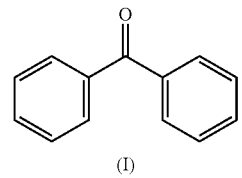

(Chemical Formula I)

(I)

As for such compounds, for example, benzophenone, 2,4-dihydroxybenzophenone, 2-hydroxy-4-methoxybenzophenone, 2,2'-dihydroxy-4,4'-dimethoxybenzophenone, 2,2',4,4-tetrahydroxybenzophenone, 2-hydroxy-4-octylbenzophenone, 4-benzyloxy-2-hydroxybenzophenone, benzophenone anil, benzophenone oxime, benzophenone chloride (α,α'-dichlorodiphenylmethane) and the like may be mentioned. The compound that has benzophenone skeleton as shown in the chemical formula I is preferable among these compounds, and more preferably the compound is any one of 2,2'-dihydroxy-4,4'-dimethoxybenzophenone and 2,2',4,4-tetrahydroxybenzophenone. By using such a benzophenone based compound, the effects described above appear remarkably. In this regard, the structural formulas (chemical formulas) of 2,2'-dihydroxy-4,4'-dimethoxybenzophenone and 2,2',4,4-tetrahydroxybenzophenone are shown in chemical formulas II, III, respectively.

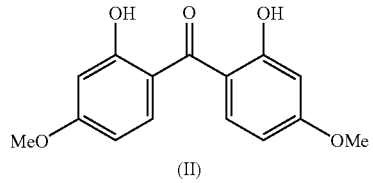

(Chemical Formula II)

(II)

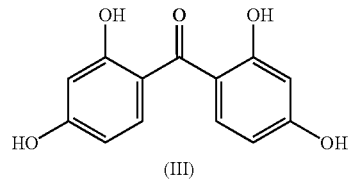

(Chemical Formula III)

(III)

Further, each of the benzophenone based compounds as described above has a relatively low melting point, a relatively low boiling point, and a relatively high solubility (compatibility) with respect to water or low molecular weight alcohols such as ethanol. Therefore, in the case of using the benzophenone based compound, it is possible to form the easily colored portion 25 (colored portion 22) having a desired thickness as described above more surely.

As a result, it is possible to exert the effects, for example, one that it is possible to improve yields in manufacturing the lens substrate (microlens substrate 1), remarkably.

Further, as for the benzotriazole based compound, a compound shown in a chemical formula IV or compounds having a benzotriazole skeleton as shown in other canonical formula corresponding to the chemical formula IV, these tautomers (hereinafter, referred to simply as "the compound having the benzotriazole skeleton shown in the chemical formula IV"), or these inductors (for example, addition reaction products, substitution reaction products, reductive reaction products, oxidation reaction products and the like) can be utilized.

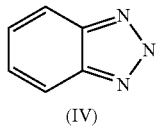

(Chemical Formula IV)

(IV)

As for such compounds, for example, benzotriazole, 2-(2-hydroxy-5-methylphenyl)-2H-benzotriazole, 2-(2-hydroxy-4-octyloxyphenyl)-2H-benzotriazole and the like may be mentioned. The compound that has benzotriazole skeleton as shown in the chemical formula IV is preferable among these compounds, and more preferably the compound is any one of 2-(2-dihydroxy-5-methylphenyl)-2H-benzotriazole and 2-(2-hydroxy-4-octyloxyphenyl)-2H-benzotriazole. By using such a benzotriazole based compound, the effects described above appear remarkably. In this regard, the structural formulas (chemical formulas) of 2-(2-dihydroxy-5-methylphenyl)-2H-benzotriazole and 2-(2-hydroxy-4-octyloxyphenyl)-2H-benzotriazole are shown in chemical formulas V, VI, respectively.

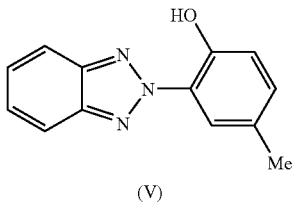

(Chemical Formula V)

(V)

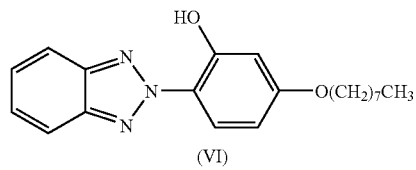

(Chemical Formula VI)

(VI)

Moreover, in the case where the process liquid contains two or more kinds of compounds selected from the benzophenone based compounds and the benzotriazole based compounds as described above (in particular, in the case where the process liquid contains one or more kind of the benzophenone based compound and one or more kind of the benzotriazole based compound), these compounds interacts with each other in a complementary manner, and with benzyl alcohol in a complementary manner. Thus, the effects as described above appear further remarkably.

In the case where the benzophenone based compound and/or the benzotriazole based compound is contained in the process liquid, the total content by percentage of the benzophenone based compound and the benzotriazole based compound in the process liquid is not particularly limited. It is preferable that the total content by percentage of the benzophenone based compound and the benzotriazole based compound in the process liquid is in the range of 0.001 to 10.0% by weight. More preferably it is in the range of 0.005 to 5.0% by weight, and further more preferably it is in the range of 0.01 to 3.0% by weight. In the case where the total content by percentage of the benzophenone based compound and the benzotriazole based compound is restricted within the above ranges, it is possible to form the suitable easily colored portions (including the first easily colored portion 25 and the second easily colored portion 26) easily and surely while preventing a harmful influence (such as deterioration of the constituent material of the main substrate 2) on the main substrate 2 on which the respective easily colored portions (including the first easily colored portion 25 and the second easily colored portion 26) are to be formed from being generated more efficiently.

Further, in the case where the benzophenone based compound and/or the benzotriazole based compound is contained in the process liquid, and the content by percentage of the benzophenone-based compound in the process liquid is defined as X (% by weight) and the total content by percentage of the benzophenone based compound and the benzotriazole based compound in the process liquid is defined as Y (% by weight), then it is preferable that X and Y satisfy the relation: $0.001 \leq X/Y \leq 10000$. More preferably X and Y satisfy the relation: $0.05 \leq X/Y \leq 1000$, and further more preferably X and Y satisfy the relation: $0.25 \leq X/Y \leq 500$. In the case where X and Y satisfy the relations as described above, synergistic effects by using the benzophenone based compound and/or the benzotriazole based compound together with benzyl alcohol are exerted more remarkably. In addition, it is possible to form the suitable easily colored portions (including the first easily colored portion 25 and the second easily colored portion 26) with a high speed easily and surely while preventing a harmful influence (such as deterioration of the constituent material of the main substrate 2) on the main substrate 2 on which the respective easily colored portions (including the first easily colored portion 25 and the second easily colored portion 26) are to be formed from being generated more efficiently. Further, for example, a coloring agent may be included in the process liquid. This makes it possible to recognize the thickness of easily colored portion easily.

In particular, in the present embodiment, by carrying out the process using the process liquid as described above repeatedly, the plurality of easily colored portions each having different colorability are formed on the main substrate 2. Namely, the method of manufacturing the microlens substrate 1 in the present embodiment includes: a step of forming the first easily colored portion 25 that is easily colored compared with other portion of the main substrate 2 (except for the second easily colored portion 26) by supplying the first process liquid onto the main substrate 2 (see FIG. 6G); a step of coloring the first easily colored portion 25 with a required color density; a step of forming the second easily colored portion 26 that is easily colored compared with other portion of the main substrate 2 (including the first easily colored portion 25) by supplying the second process liquid onto the main substrate 2 on which the first easily colored portion 25 has been formed (that is, a step of changing a part of the first easily colored portion 25 to the second easily colored portion 26) (see FIG. 6H); and a step of coloring the second easily colored portion 26 with a required color density. This makes it possible to form the first region 221 and the second region 222 each having a desired thickness and different content by percentage of the coloring agent (color density) easily and surely. In this case, the first easily colored portion 25 that has been formed through these steps corresponds to the first region 221, while the second easily colored portion 26 that has been formed through these steps corresponds to the second region 222.

It is preferable that each of the first process liquid used at the step of supplying the first process liquid onto the main substrate 2 (first process liquid supplying step) and the second process liquid used at the step of supplying the second process liquid onto the main substrate 2 (second process liquid supplying step) satisfies the conditions as described above. In particular, it is preferable that the first process liquid satisfies the conditions as described above.

Namely, the content by percentage of the benzyl alcohol in the first process liquid is not particularly limited. It is preferable that the content by percentage of the benzyl alcohol in the first process liquid is in the range of 0.1 to 8.0% by weight. More preferably it is in the range of 0.3 to 7.0% by weight, and further more preferably it is in the range of 0.5 to 6.0% by weight. In the case where the content by percentage of benzyl alcohol in the first process liquid is restricted within the above ranges, it is possible to form the suitable first easily colored portion 25 easily and surely while preventing a harmful influence (such as deterioration of the constituent material of the main substrate 2) on the main substrate 2 on which the first easily colored portion 25 is to be formed from being generated more efficiently.

Further, in the case where the first process liquid contains the benzophenone based compound and/or the benzotriazole based compound, the total content by percentage of the benzophenone based compound and the benzotriazole based compound in the first process liquid is not particularly limited. It is preferable that the total content by percentage of the benzophenone based compound and the benzotriazole based compound in the first process liquid is in the range of 0.01 to 8.0% by weight. More preferably it is in the range of 0.03 to 5.0% by weight, and further more preferably it is in the range of 0.05 to 3.0% by weight. In the case where the total content by percentage of the benzophenone based compound and the benzotriazole based compound in the first process liquid is restricted within the above ranges, it is possible to form the suitable first easily colored portion 25 easily and surely while preventing a harmful influence (such as deterioration of the constituent material of the main substrate 2) on the main substrate 2 on which the first easily colored portion 25 is to be formed from being generated more efficiently.

Moreover, it is preferable that the second process liquid satisfies the conditions as described above.

Namely, the content by percentage of the benzyl alcohol in the second process liquid is not particularly limited. It is preferable that the content by percentage of the benzyl alcohol in the second process liquid is in the range of 0.05 to 5.0% by weight. More preferably it is in the range of 0.1 to 4.0% by weight, and further more preferably it is in the range of 0.2 to 3.0% by weight. In the case where the content by percentage of benzyl alcohol in the second process liquid is restricted within the above ranges, it is possible to form the suitable second easily colored portion 26 easily and surely while preventing a harmful influence (such as deterioration of the constituent material of the main substrate 2) on the main substrate 2 on which the second easily colored portion 26 is to be formed from being generated more efficiently.

Furthermore, in the case where the second process liquid contains the benzophenone based compound and/or the benzotriazole based compound, the total content by percentage of the benzophenone based compound and the benzotriazole based compound in the second process liquid is not particularly limited. It is preferable that the total content by percentage of the benzophenone based compound and the benzotriazole based compound in the second process liquid is in the range of 0.01 to 8.0% by weight. More preferably it is in the range of 0.03 to 5.0% by weight, and further more preferably it is in the range of 0.05 to 3.0% by weight. In the case where the total content by percentage of the benzophenone based compound and the benzotriazole based compound in the second process liquid is restricted within the above ranges, it is possible to form the suitable second easily colored portion 26 easily and surely while preventing a harmful influence (such as deterioration of the constituent material of the main substrate 2) on the main substrate 2 on which the second easily colored portion 26 is to be formed from being generated more efficiently.

Further, in the case where the content by percentage of the benzyl alcohol in the first process liquid is defined as $C_1$ (gram per liter) and the content by percentage of the benzyl alcohol in the second process liquid is defined as $C_2$ (gram per liter), then it is preferable that $C_1$ and $C_2$ satisfy the relation: $1.1 \leq C_1/C_2 \leq 5.0$. More preferably $C_1$ and $C_2$ satisfy the relation: $1.2 \leq C_1/C_2 \leq 4.0$, and further more preferably $C_1$ and $C_2$ satisfy the relation: $1.3 \leq C_1/C_2 \leq 3.0$. In the case where $C_1$ and $C_2$ satisfy such relations, it is possible to form the first region 221 and the second region 222 each having a desired thickness and different content by percentage of the coloring agent more easily and more surely.

By adjusting the conditions such as the composition of each of the process liquid (including the first process liquid and the second process liquid) used at each of the steps, the processing time at each of the steps, processing temperature at each of the steps, it is possible to control the thickness of each of the first easily colored portion 25 and the second easily colored portion 26 as described above easily and surely. Further, the main substrate 2 may be subjected to heat treatment such as heating, cooling and the like, irradiation with light, decompression of the atmosphere, or the like after supplying the process liquid (that is, after supplying the first process liquid and/or after supplying the second process liquid) if needed. Alternatively, the coloring processes may be carried out consecutively.

<B7> Next, a description will be given for a step of forming the colored portion 22 by supplying the coloring liquid onto the main substrate 2 after forming the first easily colored portion 25 or after forming the second easily colored portion 26. The microlens substrate 2 is obtained through this coloring step (see FIG. 6I).

As described above, the first easily colored portion 25 is formed on the main substrate 2 prior to supplying the coloring liquid (first coloring step). For this reason, the first easily colored portion 25 is selectively colored at the present step (coloring liquid supplying step). Similarly, the second easily colored portion 26 is formed on the main substrate 2 prior to a second coloring step. For this reason, the second easily colored portion 26 is selectively colored at the present step (coloring liquid supplying step).

In particular, in the present embodiment, since the easily colored portion includes the plurality of regions each having different colorability (that is, the first easily colored portion 25 and the second easily colored portion 26) as described above, it is possible to form the colored portion 22 with the first region 221 and the second region 222 each having an optimum thickness and an optimum color density at the present step. In other words, according to the method of the present embodiment, it is possible to set the thickness and the color density of each of the first region 221 and the second region 222 to optimum values, by which it is possible to manufacture the microlens substrate 1 having excellent characteristics.

As the method of supplying the coloring liquid onto the light incident surface of the main substrate 2, for example, various types of coating methods such as a doctor blade method, a spin coat method, a blush coat method, a spray coating, an electrostatic coating, an electrodeposition coating, roll coater, printing, and a dipping method in which the main substrate 2 on which the easily colored portions including the first easily colored portion 25 and the second easily colored portion 26 have been formed (hereinafter, referred to simply as "the main substrate 2") is immersed (soaked) in the coloring liquid, and the like may be mentioned. The dipping method (in particular, dip dyeing) is suitable among these methods. This makes it possible to form the colored portion 22 (including the first region 221 and the second region 222) easily and surely. Further, in particular, in the case where the coloring liquid is supplied by means of dip dyeing, it is possible to color even a main substrate 2 formed of a material such as an acrylic based resin which is difficult to color in a conventional coloring method easily and surely. Since dye that can be used with the dip dyeing exists in a solution sufficiently, it is possible to secure the coloring seats in which the dye penetrates efficiently with a wide and deep range by interaction of benzyl alcohol with the benzophenone based compound and the benzotriazole based compound as mentioned above, by which it is possible to carry out the coloring by the dye even to a large area easily and evenly.

It is preferable that the coloring liquid supplying step is carried out while the coloring liquid and/or the main substrate 2 are heated at the range of 60 to 100° C. This makes it possible to accelerate the securement of the coloring seats by benzyl alcohol evenly even at a large area, and to further speed up the coloring speed, and therefore it is possible to form the colored portion 22 efficiently. Further, the coloring liquid supplying step may be carried out while the ambient pressure is heightened (with application of pressure). This makes it possible to accelerate the penetration of the coloring liquid into the inside of the main substrate 2, and as a result, it is possible to form the colored portion 22 efficiently with a short time.

In this regard, the step of supplying the coloring liquid may be carried out repeatedly (that is, multiple times) if needed (for example, in the case of setting the concentration of the coloring agent in the colored portion 22 (or the color density of the colored portion 22) to be formed to higher (or darker)). Further, the main substrate 2 may be subjected to heat treatment such as heating, cooling and the like, irradiation with light, pressurization or decompression of the atmosphere, or the like after supplying the coloring liquid if needed. This makes it possible to accelerate the fixing (stability) of the colored portion 22.

Hereinafter, the coloring liquid used at the present step will be described in detail.

The coloring agent contained in the coloring liquid may be any one such as various dyes and various pigments, but it is preferable that the coloring agent is a die. More preferably it is a disperse dye and/or a cationic dye, and further more preferably it is a disperse dye. This makes it possible to form the colored portion 22 efficiently while preventing a harmful influence on the main substrate 2 on which the colored portion 22 is to be formed (for example, deterioration of the constituent material of the main substrate 2) from being generated sufficiently. In particular, it is possible to color even a main substrate 2 formed of a material such as an acrylic based resin which it is difficult to color in a conventional coloring method easily and surely. It is thought that this is because it is easy to color such a material because the coloring agent as described above uses ester functions (ester bonding) that acrylic based resin or the like has as the coloring seats.

Further, the coloring liquid may contain at least a coloring agent, but it is preferable that the coloring liquid further contains benzyl alcohol and a surfactant. This makes it possible to disperse the coloring agent and the benzophenone based compound or the benzotriazole based compound stably and evenly even under the conditions in which benzyl alcohol exists. Even though the main material 2 onto which the coloring liquid is to be supplied is formed of a material such as an acrylic based resin that it is difficult to color in a conventional method, it is possible to color the main substrate 2 easily and surely. As for a surfactant, nonionic surfactants, anionic surfactants, cationic surfactants, ampholytic surfactants and the like may be mentioned. As for the nonionic surfactant, for example, ether based surfactants, ester based surfactants, ether ester based surfactants, nitrogenous based surfactants and the like may be mentioned. More specifically, polyvinyl alcohol, carboxymethylcellulose, polyethylene glycol, acrylic ester, methacrylic ester, and the like may be mentioned. Further, as for anionic surfactants, for example, various kinds of rosins, various kinds of carboxylates, various kinds of ester sulfates, various kinds of sulfonates, various kinds of ester phosphates, and the like may be mentioned. More specifically, gum rosin, polymerized rosin, disproportionated rosin, maleic rosin, fumaric rosin, maleic rosin pentaester, maleic rosin glycerolester, tristearate (for example, metal salt such as aluminum salt), distearate (for example, metal salt such as aluminum salt, barium salt), stearate (for example, metal salt such as calcium salt, lead salt, zinc lead salt), linolenate (for example, metal salt such as cobalt salt, manganese salt, lead salt, zinc salt), octanoate (for example, metal salt such as aluminum salt, calcium salt, cobalt salt), oleate (for example, metal salt such as calcium salt, cobalt salt), palmitate (metal salt such as zinc salt), naphthenate (for example, metal salt such as calcium salt, cobalt salt, manganese salt, lead salt, zinc salt), resinate (for example, metal salt such as calcium salt, cobalt salt, manganese salt, zinc salt), polyacrylate (for example, metal salt such as sodium salt), polymethacrylate (for example, metal salt such as sodium salt), polymaleate (for example, metal salt such as sodium salt), acrylate-maleate copolymer (for example, metal salt such as sodium salt), cellulose, dodecylbezenesulfonate (for example, metal salt such as sodium salt), alkylsulfonate salt, polystyrenesulfonate, (for example, (for example, metal salt such as sodium salt), alkyldiphenyletherdisulfonate (for example, metal salt such as sodium salt), and the like may be mentioned. Further, as for cationic surfactants, for example, various kinds of ammonium salts such as primary ammonium salt, secondary ammonium salt, tertiary ammonium salt, quaternary ammonium salt may be mentioned. More specifically, monoalkylamine salt, dialkylamine salt, trialkylamine salt, tetraalkylamine salt, benzalkonium salt, alkylpyridinium salt, imidazolium salt, and the like may be mentioned. Further, as for ampholytic surfactants, for example, various kinds of betaines such as carboxybetaine, sulfobetaine, various kinds of aminocarboxylic acids, various kinds of ester phosphate salts, and the like may be mentioned.

Moreover, for example, benzyl alcohol, the benzophenone based compound, the benzotriazole based compound, or the like as described above may be contained in the coloring liquid. This makes it possible to improve colorability for the main substrate 2 further.

As have been described above, in the manufacturing method of the present embodiment, by carrying out the coloring process after subjecting the main substrate 2 to a process using the process liquid containing benzyl alcohol, it is possible to color the substrate having a large area with a high speed easily and evenly even in the case where an acrylic based resin that is hardly colored is utilized as the main substrate 2. In particular, it is possible to control the concentration of the coloring agent in the colored portion 22 (or the color density of the colored portion 22) evenly and easily.

Hereinafter, a description will be given for a rear projection using the transmission screen described above.

Figure 7:
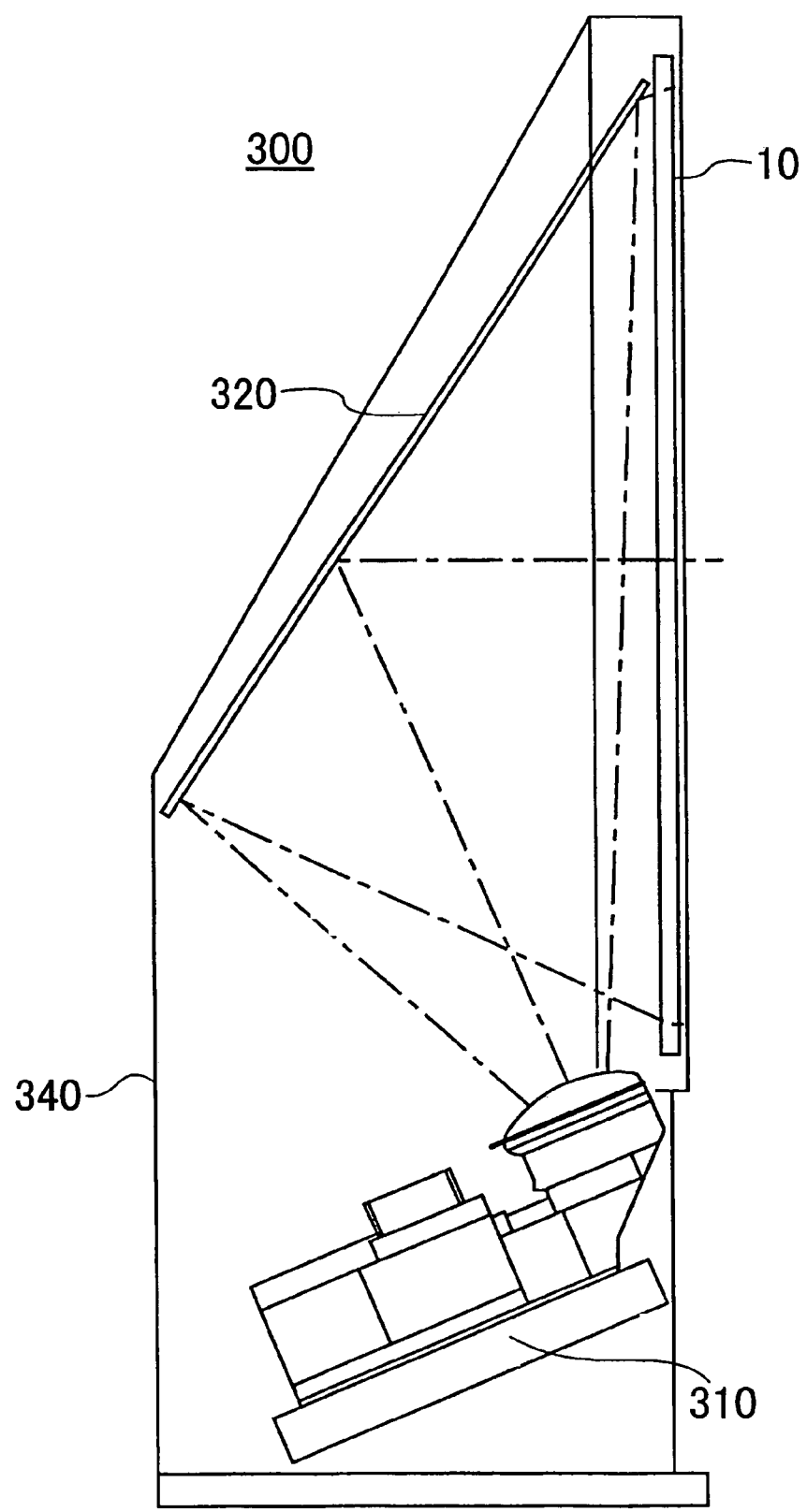
FIG. 7 is a drawing which schematically shows a rear projection to which the transmission screen of the invention is applied.

FIG. 7 is a cross-sectional view which schematically shows a rear projection 300 to which the transmission screen 10 of the invention is applied. As shown in FIG. 9, the rear projection 300 has a structure in which a projection optical unit 310, a light guiding mirror 320 and a transmission screen 10 are arranged in a casing 340.

Since the rear projection 300 uses the transmission screen 10 that has excellent angle of view characteristics and light use efficiency as described above, it is possible to obtain image having excellent contrast. In addition, since the rear projection 300 has the structure as described above in the present embodiment, it is possible to obtain excellent angle of view characteristics and light use efficiency, in particular.

Further, since the microlenses 21 are optically arranged in a random manner on the microlens substrate 1 described above, the rear projection 300 hardly generates problems such as moire extremely.

As described above, it should be noted that, even though the lens substrate (microlens substrate 1), the method of manufacturing a lens substrate, the transmission screen 10 and the rear projection 300 according to the invention have been described with reference to the preferred embodiments shown in the accompanying drawings, the invention is not limited to these embodiments. For example, each element (component) constituting the lens substrate (microlens substrate 1), the transmission screen 10 and the rear projection 300 may be replaced with one capable of performing the same or a similar function.

Further, in the embodiment described above, even though it has been described that the colored portion 22 includes the two layers 221, 222 each having a different content by percentage of the coloring agent, the colored portion 22 may be a laminated structure constituted from three or more layers, for example. Moreover, even though it has been described that the first region 221 and the second region 222 in the colored portion 22 are provided in a layer-shaped manner, the content by percentage of the coloring agent in the colored portion 22 may be changed gradually in the thickness direction thereof.

Furthermore, in the embodiment described above, even though it has been described that the plurality of regions 221, 222 each having different colorability are formed using the process liquids each having a different content by percentage of benzyl alcohol, it is possible to obtain the similar effects by, for example, using process liquids each having a different content by percentage of benzophenone and/or benzotriazole even though the content by percentage of benzyl alcohol in each of the process liquids is the same as each other, or changing the conditions for supplying the process liquid between the first process liquid supplying step and the second process liquid supplying step (for example, a processing temperature, a pressure at processing, or the like).

Further, in the embodiment described above, even though it has been described that the second region 222 having content by percentage higher than that in the first region 221 is provided at the light incident side farther than the first region 221 in the colored portion 22, arrangement of the first and second regions 221, 222 may be reversed. Namely, the colored portion 22 may have one region having a relatively low content by percentage of the coloring agent and provided at the light incident side, and the other region having a relatively high content by percentage of the coloring agent and provided at the light emission side when viewed from the one region. Such a colored portion can be formed in the following manner. Namely, as the embodiment described above, the main substrate 2 is subjected to a process using the process liquid once. Then, a colored portion having an even content by percentage of the coloring agent is formed at the light incident surface side of the main substrate 2 by supplying the coloring liquid thereto. A solvent that can eliminate the coloring agent and does not have a harmful influence on the lens substrate is then supplied to the lens substrate on which the even colored portion has been formed. Thus, the coloring agent included in the colored portion 22 is preferentially eliminated from the vicinity of the colored portion 22. Therefore, it is possible to obtain the lens substrate that includes one region having a relatively low content by percentage of the coloring agent provided at the light incident side (the light incident surface side of the microlens substrate (lens substrate) 1 and the other region having a relatively high content by percentage of the coloring agent provided at the light incident side farther than the one region.

Further, the lens substrate of the invention is any one as long as it has the plurality of regions each having a different content by percentage of the coloring agent laminated in the thickness direction of the lens substrate. The lens substrate of the invention is not limited to one on which the colored portion 22 is formed as described above. For example, the colored portion 22 in the lens substrate of the invention may be formed by carrying out a process using a liquid that contains a relatively low content by percentage of the coloring agent, and then carrying out a process using a coloring liquid that contains a relatively high content by percentage of the coloring agent. Further, for example, the colored portion 22 may be formed on the main substrate 2 with a laminated structure by supplying a resin material having fluidity that contains the coloring agent onto the light incident surface of the lens substrate (microlens substrate 1).

Moreover, in the embodiment described above, even though it has been described that at the initial hole formation step in the method of manufacturing the substrate 6 with concave portions for forming microlenses 21 the initial concave portions 71 were formed in the substrate 7 in addition to the initial holes 81, there is no need to form such initial concave portions 71. By appropriately adjusting the formation conditions for the initial holes 81 (for example, energy intensity of a laser, the beam diameter of the laser, irradiation time or the like), it is possible to form the initial concave portions 71 each having a predetermined shape, or it is possible to selectively form only the initial holes 81 so that the initial concave portions 71 are not formed.

Furthermore, in the embodiment described above, even though it has been described that the black matrix 3 is formed prior to formation of the easily colored portion (including the first easily colored portion 25 and the second easily colored portion 26) and the colored portion 22 if needed, the black matrix 3 may be formed after the formation of the easily colored portion (including the first easily colored portion 25 and the second easily colored portion 26) and the colored portion 22 if needed.

Further, in the embodiment described above, even though it has been described that the lenses with which the lens substrate (microlens substrate 1) is provided are the convex lenses, the lens (lens portion) with which the lens substrate is provided may be concave lenses, for example.

Moreover, in the embodiment described above, even though it has been described that the colored portion is provided on the whole light incident surface of the lens substrate (microlens substrate 1), the colored portion may be provided on a part of the light incident surface of the lens substrate.

Furthermore, in the embodiment described above, even though it has been described that the microlenses 21 are arranged in a random manner when viewed from above the light incident surface or the light emission surface of the lens substrate (microlens substrate 1), the shape and arrangement of the microlenses 21 are not limited to the above. For example, the microlenses 21 may be arranged in a lattice-like pattern, or may be formed in a honeycombed pattern.

Further, in the embodiment described above, even though it has been described that the transmission screen 10 is provided with the microlens substrate (lens substrate) 1 and the Fresnel lens 5, the transmission screen 10 of the invention need not be provided with the Fresnel lens 5 necessarily. For example, the transmission screen 10 may be constructed from only the microlens substrate (lens substrate) 1 of the invention practically.

Moreover, in the embodiment described above, even though the structure where the microlens substrate 1 (lens substrate) is provided with the microlenses 21 as lens portions having desired shapes from the viewpoint of the angle of view has been described, the lens portions constituting the lens substrate is not limited to the microlenses 21. For example, the lens portions may be lenticular lenses. By using the lenticular lenses, it is possible to simplify the manufacturing step for the lens portions, and therefore, it is possible to improve the productivity of the transmission screen 10. In the case of using the lenticular lens as the lens portion, a stripe-shaped light shielding layer (black stripe) is formed in place of the black matrix 3. According to such a structure, it is possible to obtain the operations and effects similar to those in the embodiment described above.

Furthermore, in the embodiment described above, even though it has been described that the black matrix 3 is directly formed on the surface of the main substrate 2, the black matrix 3 may be bonded to the main substrate via a ground layer (a adhesive layer) or the like, for example. Further, in the embodiment described above, even though it has been described that the black matrix (light shielding layer) 3 is formed on the main substrate 2 by applying the photopolymer including a material having a light shielding effect onto the surface of the microlens substrate (lens substrate) 1, the method of forming the black matrix (light shielding layer) 3 is not limited thereto. For example, the black matrix 3 may be formed by means of dyeing, chemical color development, discoloration or the like.

Moreover, in the embodiment described above, even though the case where the lens substrate is provided with the black matrix 3 has been described as mentioned above, it goes without saying that the lens substrate is not provided with such a black matrix 3.

Furthermore, in the embodiments described above, even though it has been described that the lens substrate (microlens substrate 1) is a member constituting the transmission screen 10 or the rear projection 300, the lens substrate (microlens substrate 1) is not limited to one to be applied to a transmission screen 10 or rear projection 300, and it may be applied to one for any use. For example, the lens substrate (microlens substrate 1) may be applied to a constituent member of a liquid crystal light valve in a projection display (front projection).

EXAMPLE

<Manufacture of Lens Substrate and Transmission Screen>

Example 1

A substrate with concave portions for forming microlenses equipped with concave portions for forming microlenses was manufactured in the following manner. Then, a microlens substrate was manufactured using this substrate with concave portions for forming microlenses.

First, a soda-lime glass substrate having a rectangle shape of 1.2 m×0.7 m and a thickness of 4.8 mm was prepared.

The substrate of soda-lime glass was soaked in cleaning liquid containing 4% by weight ammonium hydrogen difluoride and 8% by weight hydrogen peroxide to carry out a 6 µm etching process, thereby cleaning its surface. Then, cleaning with pure water and drying with nitrogen ($N_2$) gas (for removal of pure water) were carried out.

Next, a laminated structure including a layer formed of chromium and a layer formed of chromium oxide (that is, the laminated structure in which the chromium was laminated on the outer surface of the chromium oxide) was formed on the soda-lime glass substrate by means of a sputtering method. Namely, a mask and a back surface protective film each made of the laminated structure constructed from the chromium layer and the chromium oxide layer were formed on both surfaces of the substrate of soda-lime glass. In this regard, the thickness of the chromium layer is 0.02 µm, and the thickness of the chromium oxide layer is 0.02 µm.

Next, laser machining was carried out to the mask to form a large number of initial holes within a region of 113 cm×65 cm at the central part of the mask. In this regard, the laser machining was carried out using a YAG laser under the conditions of energy intensity of 1 mW, a beam diameter of 3 µm, and an irradiation time of $60 \times 10^{-9}$ seconds. In this way, the initial holes were formed in a random pattern over the entire region of the mask mentioned above. The average diameter of the initial holes is 5 µm, and the formation density of the initial holes was 40,000 holes/$cm^2$.

In addition, at this time, concave portions each having a depth of about 0.1 µm and a damaged layer (or affected layer) were formed on the surface of the soda-lime glass substrate.

Next, the soda-lime glass substrate was subjected to a wet etching process, thereby forming a large number of concave portions on the soda-lime glass substrate. The large number of concave portions thus formed had substantially the same radius of curvature (that is, 35 µm) as each other.

In this regard, an aqueous solution containing 4% by weight ammonium hydrogen difluoride and 8% by weight hydrogen peroxide was used for the wet etching process as an etchant, and the soak time of the substrate was 5 hours.

Next, the mask and back surface protective film were removed by carrying out an etching process using a mixture of ceric ammonium nitrate and perchloric acid. Then, cleaning with pure water and drying with $N_2$ gas (removal of pure water) were carried out.

In this way, a wafer-like substrate with concave portions for forming microlenses in which the large number of concave portions for forming microlenses were arranged in a random manner on the soda-lime glass substrate was obtained. A ratio of an area occupied by all the concave portions in a usable area where the concave portions were formed with respect to the entire usable area was 97% when viewed from above any one of the light incident surface and the light emission surface of the obtained substrate with concave portions. A large number of distances between arbitrarily adjacent two points in the substrate with concave portions for forming microlenses (that is, the distance between the center of a concave portion and the center of an adjacent concave portion) were measured, and a standard deviation of these distances was then calculated. The standard deviation obtained by such a calculation was 32% of the average value of the large number of distances.

Next, a mold release agent (GF-6110) was applied to the surface of the substrate with concave portions for forming microlenses obtained as described above on which the concave portions were formed, and a non-polymerized (uncured) acrylic based resin (PMMA resin (methacryl resin)) in which polystyrene beads were mixed as diffusion media was applied to the same surface side. At this time, substantially spherical-shaped spacers (each having a diameter of 30 μm) were arranged at regions on the above surface where the concave portions of the substrate with concave portions for forming microlenses were not formed. In this case, the amount of the diffusion media was adjusted so that Haze (the degree of fog: Td/Tt, Td: transmittance of diffused light, Tt: transmittance of all light) became 70%.

Next, the acrylic based resin was pressed (pushed) with a flat plate formed of soda-lime glass. At this time, this process was carried out so that air was not intruded between the flat plate and the acrylic based resin. In this case, a mold release agent (GF-6110) was applied in advance onto the surface of the flat plate with which the acrylic based resin has been in contact when pushing the acrylic based resin.

Then, by heating the acrylic based resin via the flat plate, the acrylic based resin was cured to obtain a main substrate. The thickness of the resin layer in the obtained main substrate was 2 mm, and the radius of curvature and the diameter of each of the plurality of microlenses were 35 μm and 70 μm. Moreover, a ratio of an area (projected area) occupied by all the microlenses in a usable area where the microlenses were formed with respect to the entire usable area was 97% when viewed from above any one of the light incident surface and the light emission surface of the obtained microlens substrate.

Next, the flat plate was removed.

Next, a positive type photopolymer to which a light shielding material (carbon black) was added (PC405G: made by JSR Corporation) was supplied onto the light emission surface of the main substrate (the surface opposite to the surface on which the microlenses had been formed) by means of roll coater. The content by percentage of the light shielding material in the photopolymer was 20% by weight.

Next, the main substrate was subjected to a pre-bake process of 90° C.×30 minutes.

Next, ultraviolet rays of 80 mJ/cm$^2$ were irradiated through the surface opposite to the surface on which the concave portions in the substrate with concave portions for forming microlenses had been formed as parallel light. Thus, the irradiated ultraviolet rays were condensed by each of the microlenses, and the photopolymer in the vicinity of the focal point f of each of the microlenses (in the vicinity of the thickness direction of the black matrix) was exposed selectively.

The main substrate was subjected to a developing process for 40 seconds using an aqueous solution containing 0.5% by weight KOH. Then, cleaning with pure water and drying with $N_2$ gas (removal of pure water) were carried out. Further, the main substrate was subjected to a post-bake process of 200° C.×30 minutes. Thus, a black matrix having a plurality of openings respectively corresponding to the microlenses was formed. The thickness of the formed black matrix was 2 μm, and the diameter of each of the openings was 45 μm.

The main substrate was then released from the substrate with concave portions for forming microlenses.

Then, a first process liquid containing benzyl alcohol was supplied onto the main substrate by means of dipping. This process was carried out so that the whole surface on which the microlenses were formed was brought into contact with the first process liquid, but the surface on which the black matrix was formed was not in contact with the first process liquid. Further, the temperature of the main substrate and the first process liquid when supplying the first process liquid onto the main substrate was adjusted to be 90° C. A mixture containing benzyl alcohol: 15 part by weight, benzophenone and 2,2'-dihydroxy-4,4'-dimethoxybenzophenone (benzophenone based compound): 3 part by weight, 2-(2-hydroxy-5-methylphenyl)-2H-benzotriazole (benzotriazole based compound): 2 part by weight, and pure water: 1000 part by weight was used as the first process liquid.

The main substrate was brought out from a bath in which the first process liquid was stored after the main substrate was brought into contact with the first process liquid under the conditions as described above for 15 minutes, and the main substrate was then washed and dried. In this way, the main substrate on which a first easily colored portion was formed was obtained.

Next, a coloring liquid was supplied to the main substrate on which the first easily colored portion has been formed by means of dip dyeing. This process was carried out so that the whole surface on which the microlenses were formed was brought into contact with the coloring liquid, but the surface on which the black matrix was formed was not in contact with the coloring liquid. Further, the temperature of the main substrate and the coloring liquid when supplying the first process liquid onto the main substrate was adjusted to be 90° C. A mixture containing disperse dye (Blue) (made by Futaba Sangyo): 2 part by weight, disperse dye (Red) (made by Futaba Sangyo): 0.1 part by weight, disperse dye (Yellow) (made by Futaba Sangyo): 0.05 part by weight, benzyl alcohol: 4 part by weight, a surfactant: 2 part by weight, and pure water: 1000 part by weight was used as the coloring liquid.

The main substrate was brought out from a bath in which the coloring liquid was stored after the main substrate was brought into contact with the process liquid under the conditions as described above for 15 minutes, and the main substrate was washed sufficiently, and then cleaning with pure water and drying with $N_2$ gas (removal of pure water)

were carried out. In this way, the main substrate (microlens substrate) on which a colored portion was formed was obtained. In this regard, another unprocessed substrate (that is, sample) having the same structure as the above main substrate was subjected to the first process liquid supplying process and the coloring liquid supplying process under the conditions exactly same as the conditions described above. When the spectral transmittance of this sample was measured, the color density of the colored portion thus formed was 68% by Y value (D65/2° angle of view).

Next, a second process liquid containing benzyl alcohol was supplied onto the main substrate on which the first region (first colored portion) by means of dipping. This process was carried out so that the whole surface on which the microlenses were formed was brought into contact with the second process liquid, but the surface on which the black matrix was formed was not in contact with the second process liquid. Further, the temperature of the main substrate and the second process liquid when supplying the second process liquid onto the main substrate was adjusted to be 90° C. A mixture containing benzyl alcohol: 10 part by weight, benzophenone and 2,2'-dihydroxy-4,4'-dimethoxybenzophenone (benzophenone based compound): 3 part by weight, 2-(2-hydroxy-5-methylphenyl)-2H-benzotriazole (benzotriazole based compound): 2 part by weight, a surfactant: 2 part by weight, and pure water: 1000 part by weight was used as the second process liquid.

The main substrate was brought out from a bath in which the second process liquid was stored after the main substrate was brought into contact with the second process liquid under the conditions as described above for 10 minutes. In this way, the main substrate on which a second easily colored portion was formed was obtained.

Next, a coloring liquid was supplied to the main substrate on which the second easily colored portion has been formed by means of dip dyeing. This process was carried out so that the whole surface on which the microlenses were formed was brought into contact with the coloring liquid, but the surface on which the black matrix was formed was not in contact with the coloring liquid. Further, the temperature of the main substrate and the coloring liquid when supplying the first process liquid onto the main substrate was adjusted to be 90° C. A mixture containing disperse dye (Blue) (made by Futaba Sangyo): 2 part by weight, disperse dye (Red) (made by Futaba Sangyo): 0.1 part by weight, disperse dye (Yellow) (made by Futaba Sangyo): 0.05 part by weight, benzyl alcohol: 12 part by weight, a surfactant: 2 part by weight, and pure water: 1000 part by weight was used as the coloring liquid.

The main substrate was brought out from a bath in which the coloring liquid was stored after the main substrate was brought into contact with the process liquid under the conditions as described above for 15 minutes, and then cleaning with pure water and drying with $N_2$ gas (removal of pure water) were carried out. In this way, the main substrate (microlens substrate) on which a colored portion was formed was obtained. Further, the colored portion included a first region in which the content by percentage of the coloring agent in the inside of the microlens substrate was relatively low, and a second region in which the content by percentage of the coloring agent at the surface side of the microlens substrate was relatively high. In this regard, another unprocessed substrate (that is, sample) having the same structure as the above main substrate was subjected to only the second process liquid supplying process and the coloring liquid supplying process under the conditions exactly same as the conditions described above. When the spectral transmittance of this sample was measured, the color density of the colored portion thus formed was 56% by Y value (D65/2° angle of view). Moreover, when the thickness of the colored portion was measured by means of an ellipsometry (deflection analyzing) method, the thickness of the first region was about 5.3 μm, and the thickness of the second region was 0.9 μm.

In the microlens substrate obtained in this way, a ratio of an area (projected area) occupied by all the openings in a usable area where the microlenses were formed with respect to the entire usable area was 50% when viewed from above any one of the light incident surface and the light emission surface of the obtained microlens substrate.

By assembling the microlens substrate manufactured as described above and a Fresnel lens manufactured by extrusion molding, the transmission screen as shown in FIG. 3 was obtained.

Examples 2 to 7

The content by percentage of each of benzyl alcohol, the benzophenone based compound and the benzotriazole based compound in the process liquid (that is, the first process liquid and the second process liquid) and the coloring liquid (that is, the first coloring liquid and the second coloring liquid), the temperature of the main substrate and the process liquid when supplying the process liquid (that is, the first process liquid and the second process liquid) onto the main substrate, and the temperature of the main substrate and the coloring liquid when supplying the coloring liquid (that is, the first coloring liquid and the second coloring liquid) onto the main substrate were changed. In this way, microlens substrates and transmission screens in respective Examples 2 to 7 were manufactured in the manner similar to that in Example 1 except that the content by percentage of each of benzyl alcohol, the benzophenone based compound and the benzotriazole based compound, and the temperature of the main substrate and the process liquid or the coloring liquid were changed as shown in TABLE 1.

Example 8

A microlens substrate and a transmission screen were manufactured in the manner similar to those in Example 1 except that a black matrix was not formed on the main substrate.

Comparative Example 1

A microlens substrate and a transmission screen were manufactured in the manner similar to those in Example 8 described above except that the easily colored portions (including the first easily colored portion and the second easily colored portion) and the colored portion (including the first region and the second region) were not formed on the main substrate.

Comparative Example 2

First, a soda-lime glass substrate having a rectangle shape of 1.2 m×0.7 m and a thickness of 4.8 mm was prepared.

The soda-lime glass was subjected to a 6 μm etching process by immersing (or soaking) it within a cleaning solution containing 4% by weight ammonium hydrogen difluoride and 8% by weight hydrogen peroxide, by which the surface thereof was cleaned. Then, cleaning with pure water and drying with $N_2$ gas (removal of pure water) were carried out.

Next, chromium layers (a mask and a rear face protective film) each having a thickness of 0.03 μm were formed on both major surfaces of the soda-lime glass substrate by means of a sputtering method. Namely, a mask and a rear face protective film each made of a layer formed of chromium were formed on both surfaces of the substrate of soda-lime glass.

Next, laser machining was carried out to the mask to form a large number of straight-shaped grooves (holes) within a region of 113 cm×65 cm at the central part of the mask so that the grooves were parallel to each other. The pitch between the adjacent grooves was 140 μm.

In this regard, the laser machining was carried out using a YAG laser under the conditions of energy intensity of 1 mW, a beam diameter of 3 μm, and an irradiation time of $60\times10^{-9}$ seconds. In addition, at this time, concave portions each having a depth of about 0.1 μm and a damaged layer (or affected layer) were formed on the surface of the soda-lime glass substrate.

Next, the soda-lime glass substrate was subjected to a wet etching process, thereby forming groove-shaped concave portions on the soda-lime glass substrate. The formed concave portions had substantially the same curvatures (35 μm) as each other.

In this regard, an aqueous solution containing 4% by weight ammonium hydrogen difluoride and 8% by weight hydrogen peroxide was used for the wet etching as an etchant, and the soak time of the substrate was 5 hours.

Next, the chromium layers (the mask and rear face protective film) were removed by carrying out an etching process using a mixture of ceric ammonium nitrate and perchloric acid. Then, cleaning with pure water and drying with $N_2$ gas (removal of pure water) were carried out.

As a result, a wafer-like substrate with concave portions for lenticular lenses where a large number of concave portions (grooves) for lenticular lenses were formed on the soda-lime glass substrate was obtained.

Next, a mold release agent (GF-6110) was applied to the surface of the substrate with concave portions for lenticular lenses obtained as described above on which the concave portions were formed, and a non-polymerized (uncured) acrylic based resin (PMMA resin (methacryl resin)) was applied to the same surface side. At this time, substantially spherical-shaped spacers (each having a diameter of 30 μm) were arranged at regions on the above surface where the concave portions of the substrate with concave portions for lenticular lenses were not formed.

Next, the acrylic based resin was pressed (pushed) with a flat plate formed of soda-lime glass. At this time, this process was carried out so that air was not intruded between the flat plate and the acrylic based resin. In this case, a mold release agent (GF-6110) was applied in advance onto the surface of the flat plate with which the acrylic based resin has been in contact when pushing the acrylic based resin.

Then, by heating the acrylic based resin, the acrylic based resin was cured to obtain the lenticular lens substrate. The thickness of the resin layer in the obtained lenticular lens substrate was 1 mm, and the radius of curvature of each of the plurality of lenticular lenses was 35 μm.

Next, the lenticular lens substrate was obtained by releasing the flat plate used to push the acrylic based resin and the substrate with concave portions for lenticular lenses from the lenticular lens substrate.

By assembling the lenticular lens substrate manufactured as described above and a Fresnel lens manufactured by means of extrusion molding, the transmission screen was obtained in the same manner as that in Example 1.

Comparative Example 3

The main substrate on which a black matrix was not formed was manufactured as well as that in Example 1 described above. Then, the easily colored portion (including a first easily colored portion and a second easily colored portion), and the colored portion (including a first region and a second region) were formed on the light emission surface of the main substrate as well as those in Example 1 while the main substrate was close to the substrate with concave portions for forming microlenses. By removing the substrate with concave portions for forming microlenses from the main substrate, a microlens substrate was then obtained. Further, a transmission screen was manufactured using the microlens substrate thus obtained as well as that in Example 1 described above.

Comparative Example 4

A microlens substrate and a transmission screen were manufactured in the manner similar to those in Example 1 except that the process of supplying the coloring liquid to the first easily colored portion was carried out after the first process liquid supplying process, but the second process liquid supplying process and the coloring liquid supplying process to the second easily colored portion were not carried out.

Comparative Example 5

A microlens substrate and a transmission screen were manufactured in the manner similar to those in Example 1 except that the process of supplying the coloring liquid to the first easily colored portion was carried out after the first process liquid supplying process, but the second process liquid supplying process and the coloring liquid supplying process to the second easily colored portion were not carried out.

Comparative Example 6

A lenticular lens substrate provided with a colored portion having an even content by percentage of the coloring agent on the light incident surface thereof was manufactured as follows.

Figure 8:
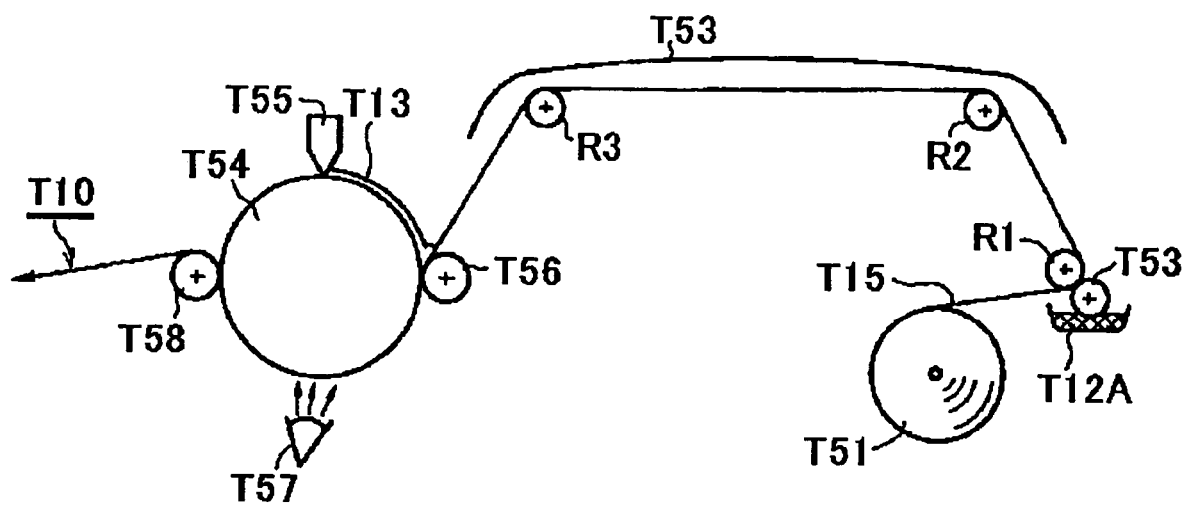
FIG. 8 is a configuration of a manufacturing apparatus used to manufacture a lenticular lens substrate of Comparative Example.

First, as shown in FIG. 8, an apparatus for manufacturing a lenticular lens substrate T50 was prepared. The manufacturing apparatus T50 was provided with: a roll T51 in which a base member T15 formed of a serial film-shaped acrylic based resin was rolled; a coater (coating machine) T52 for coating a non-polymerized (uncured) acrylic based resin (transparent resin) T12A having transparency and no colored that was diluted with a solvent; a drying apparatus T53 for drying the transparent resin T12A coated on the base member T15; a mold roll T54 on which the mold for the shape of a lenticular lens was formed; a dispenser T55 for coating the colored non-polymerized (uncured) acrylic based resin (colored resin) T13 onto the mold roll T54; a nip roll T56 which nipped the base member T15 by clipping the colored resin T13 and the transparent resin T12A on the mold roll T54; an UV lamp T57 for irradiating UV rays onto the colored resin T13 and the transparent resin T12A within the mold roll T54; and a release roll T58 for releasing the formed lenticular lens substrate (lenticular lens sheet) T10 from the mold roll T54.

In the apparatus for manufacturing a lenticular lens substrate T50, the transparent resin T12A having high viscosity was diluted with a solvent and coated on the film-shaped base member T15 using the coater T52 (transparent resin coating step). The transparent resin layer in which fluidity thereof was suppressed was then formed by drying the transparent resin T12A with warm air by means of the drying apparatus T53 (solvent drying step).

Next, the colored resin T13 was coated on the mold roll T54, and the base member T15 on which the transparent resin T12 was coated was nipped on the mold roll T54 on which the colored resin T13 was coated by means of the nip roll T56 so that the colored resin T13 and the transparent resin T12A were stacked.

The UV rays were then irradiated to the colored resin T13 and the transparent resin T12A thus stacked from the base member T15 side by means of the UV lamp T57, by which the colored resin T13 and the transparent resin T12A were cured. Finally, the lenticular lens substrate T10 in which the lens portion T12 was formed on the base member T15 from the colored resin T13 and the transparent resin T12A was released from the mold roll T54 by means of the release roll T58. In this way, the lenticular lens substrate T10 was obtained.

The obtained lenticular lens substrate T10 had a rectangle shape of 1.2 m×0.7 m, and a large number of straight-shaped lenticular lenses were formed in the area of 113 cm×65 cm of the obtained lenticular lens substrate T10 so as to become parallel to each other. Further, the thickness of the resin in the obtained lenticular lens substrate T10 was 1 mm. Moreover, the color density of the colored portion was 52% by Y value (D65/2° view) on the basis of the spectral transmittance. Furthermore, the pitch between the adjacent grooves (that is, the pitch between the adjacent lenticular lenses) was 70 µm. Further, each of the formed lenticular lenses had substantially the same radius of curvature as each other (35 µm).

In this regard, a PMMA resin (methacryl resin) was utilized as the acrylic based resin constituting the base member T15, the transparent resin T12A and the colored resin T13. Further, as the colored resin T13, a pigment generally called as Tint media was kneaded into the base member T15 in advance. Moreover, although the disperse media was mixed in the resin, for comparison, Haze was set to 70% as well as other levels.

By assembling the lenticular lens substrate manufactured as described above and a Fresnel lens manufactured by means of extrusion molding, the transmission screen was obtained in the same manner as that in Example 1.

A part of the conditions of the process liquid (including the first process liquid and the second process liquid) used to form the easily colored portion (including the first easily colored portion and the second easily colored portion) and a part of the conditions of the coloring liquid (including the first coloring liquid and the second coloring liquid) used to form the colored portion (including the first region and the second region), the temperature of the main substrate and the process liquid or the coloring liquid when supplying the process liquid (including the first process liquid and the second process liquid) and the coloring liquid (including the first coloring liquid and the second coloring liquid) onto the main substrate in each of Examples 1 to 8 and Comparative Examples 1 to 6 were shown in TABLES 1 and 2 as a whole.

TABLE 1

| | First Process Liquid | | | First Coloring Liquid | | | Concentration of Colored Portion |
|---|---|---|---|---|---|---|---|
| | Content by % of Benzyl alcohol X [wt %] | Total Content by % of benzophenone comp. and benzotriazole comp. Y [wt %] | Temperature of Main Substrate and Process Liquid [° C.] * time[min] | Content by % of Benzyl alcohol X [wt %] | Processing Time [min] | Temperature of Main Substrate and Process Liquid [° C.] | (Reference by Other Substrate) Y Value (D65/2° View) [%] |
| EX. 1 | 1.5 | 0.7 | 90 * 20 | 1 | 15 | 90 | 68 |
| EX. 2 | 3 | 0.5 | 80 * 20 | 1 | 15 | 80 | 66 |
| EX. 3 | 2.5 | 0.5 | 80 * 20 | 1 | 15 | 80 | 52 |
| EX. 4 | 5 | 0.1 | 90 * 20 | 1 | 15 | 90 | 50 |
| EX. 5 | 1.5 | — | 90 * 20 | 1 | 15 | 80 | 69 |
| EX. 6 | 3 | 0.5 | 90 * 20 | 1 | 15 | 80 | 53 |
| EX. 7 | 3 | — | 90 * 20 | 1 | 15 | 80 | 68 |
| EX. 8 | 1.5 | 0.5 | 90 * 20 | 1 | 15 | 80 | 58 |
| Co-EX. 1 | — | — | — | — | — | — | — |
| Co-EX. 2 | — | — | — | — | — | — | — |
| Co-EX. 3 | 2.5 | 0.5 | 80 * 20 | 1 | 15 | 80 | 52 |
| Co-EX. 4 | 0.5 | 0.5 | 90 * 20 | 1 | 10 | 80 | 66 |
| Co-EX. 5 | 0.5 | 0.5 | 90 * 20 | 1 | 15 | 90 | 50 |
| Co-EX. 6 | 1 | — | 80 | 1 | | 80 | 52 |

TABLE 2

| | Second Process Liquid | | | Second Coloring Liquid | | | Concentration of Colored Portion |
|---|---|---|---|---|---|---|---|
| | Content by % of Benzyl alcohol X [wt %] | Total Content by % of benzophenone comp. and benzotriazole comp. Y [wt %] | Temperature of Main Substrate and Process Liquid [° C.] * time[min] | Content by % of Benzyl alcohol X [wt %] | Processing Time [min] | Temperature of Main Substrate and Process Liquid [° C.] | (Reference by Other Substrate) Y Value (D65/2° View) [%] |
| EX. 1 | 1 | 0.5 | 80 * 10 | 1.2 | 15 | 90 | 56 |
| EX. 2 | 2 | 0.25 | 80 * 15 | 1 | 15 | 80 | 60 |
| EX. 3 | 0.5 | 0.25 | 80 * 15 | 3 | 15 | 80 | 64 |
| EX. 4 | 4 | 0.25 | 90 * 15 | 3 | 15 | 90 | 50 |
| EX. 5 | 1 | 0.5 | 80 * 15 | 3 | 15 | 80 | 54 |
| EX. 6 | 1.5 | — | 80 * 15 | 3 | 15 | 80 | 69 |
| EX. 7 | 1.5 | — | 80 * 15 | 3 | 15 | 80 | 69 |
| EX. 8 | 1 | 0.5 | 80 * 15 | 3 | 15 | 80 | 58 |
| Co-EX. 1 | — | — | — | — | — | — | — |
| Co-EX. 2 | — | — | — | — | — | — | — |
| Co-EX. 3 | 0.5 | 0.25 | 80 * 15 | 3 | 15 | 80 | 64 |
| Co-EX. 4 | — | — | — | — | — | — | — |
| Co-EX. 5 | — | — | — | — | — | — | — |
| Co-EX. 6 | — | — | — | — | — | — | — |

<Evaluation for Contrast>

The evaluation for contrast was carried out with respect to the transmission screen manufacture in each of Examples 1 to 8 and Comparative Examples 1 to 6 described above. A ratio LW/LB of front side luminance (white luminance) LW (cd/m$^2$) of white indication when total white light having illuminance of 413 luces entered the transmission screen in the rear projection at a dark room to the increasing amount of front side luminance (black luminance increasing amount) LB (cd/m$^2$) of black indication when a light source was fully turned off at a bright room was calculated as contrast (CNT). In this regard, the measurement at the bright room was carried out under the conditions in which the illuminance of outside light was about 185 luces. Further, a luminance meter made by TOPCON was used in measuring the brightness.

<Manufacture of Rear Projection>

A rear projection as shown in FIG. 7 was manufactured (assembled) using the transmission screen manufactured in each of Examples 1 to 8 and Comparative Examples 1 to 6.

<Evaluation of Color Heterogeneity>

The spectral transmittance of the transmission screen in the rear projection of each of Examples 1 to 8 and Comparative Examples 1 to 6 described above was measured with respect to 20 points in each sample image. A difference ΔT(Y) % between the maximum value and the minimum value of the Y value (D65/2° angle of view) on the basis of the measured spectral transmittance was defined as color heterogeneity. The generation status of color heterogeneity in the rear projection of each of Examples 1 to 8 and Comparative Examples 1 to 6 was evaluated on the basis of the following four-step standard.

A: ΔT(Y)<3, where no color heterogeneity was recognized.

B: 3≦ΔT(Y)<5, where little color heterogeneity was recognized.

C: 5≦ΔT(Y)<10, where color heterogeneity was slightly recognized.

D: 10≦ΔT(Y), where color heterogeneity was remarkably recognized.

<Measurement of Angle of View>

The measurement of angles of view in both horizontal and vertical directions was carried out while a sample image was displayed on the transmission screen in the rear projection of each of Examples 1 to 8 and Comparative Example 1 to 6. The measurement of the angles of view was carried out under the conditions in which the measurement was carried out at intervals of one degree with a gonio photometer MPC3100 (made by Shimadzu Corporation).

<Evaluation of Long-Term Stability>

The transmission screen manufactured in each of Examples 1 to 8 and Comparative Examples 1 to 6 was placed right before a light emitting portion of a projection optical unit of a rear projection that irradiates light of 450 luces, and long-term stability thereof was evaluated at an accelerated pace.

The difference in tone of color (amount of change ΔT(Y)) in the transmission screen of each of Examples 1 to 8 and Comparative Examples 1 to 6 at about 10 hours after the start of irradiation of light was defined as deterioration and unevenness, and they were evaluated on the basis of the following four-step standard.

A: ΔT(Y)<3, where no deterioration and unevenness were recognized.

B: 3≦ΔT(Y)<5, where little deterioration and unevenness were recognized.

C: 5≦ΔT(Y)<10, where deterioration and unevenness were slightly recognized.

D: 10≦ΔT(Y), where deterioration and unevenness were remarkably recognized.

These results were shown in TABLE 3 as a whole together with the thickness of the colored portion (including the first region and the second region).

TABLE 3

| | Difference of Permeability | Color | Thickness of Colored Portion [mm] | | | Contrast (Outside Light Reflection Brightness) | Angle of View [°] | | Long-term | |
|---|---|---|---|---|---|---|---|---|---|---|
| | DT (Y) % | Heterogeneity | First Region | Second Region | D1/D2 | [cd/m2] | Vertical | Horizontal | Stability | $X_1/X_2$ |
| EX. 1 | 2 | A | 5.3 | 0.9 | 5.9 | 3872 | 72 | 108 | A | 0.01 |
| EX. 2 | 3 | B | 4.6 | 0.6 | 7.6 | 2761 | 70 | 106 | A | 0.1 |
| EX. 3 | 4 | B | 4.8 | 0.4 | 12 | 3288 | 72 | 106 | A | 0.05 |
| EX. 4 | 4 | B | 4.2 | 1.3 | 3.2 | 3003 | 72 | 106 | A | 0.1 |
| EX. 5 | 3 | A | 3.2 | 0.4 | 8 | 2832 | 68 | 108 | A | 0.1 |
| EX. 6 | 4 | B | 4.1 | 0.2 | 20.5 | 2614 | 70 | 106 | A | 0.1 |
| EX. 7 | 4 | B | 3.1 | 0.2 | 15.5 | 2538 | 72 | 105 | A | 0.5 |
| EX. 8 | 3 | A | 4.3 | 0.6 | 7.1 | 2735 | 70 | 106 | A | 0.5 |
| Co-EX. 1 | — | — | — | — | — | 1435 | 72 | 108 | A | — |
| Co-EX. 2 | — | — | — | — | — | 1513 | 36 | 106 | A | — |
| Co-EX. 3 | 4 | B | 4.7 | 0.5 | 9.4 | 1736 | 70 | 106 | A | 0.1 |
| Co-EX. 4 | 8 | C | — | — | — | 2432 | 72 | 105 | A | — |
| Co-EX. 5 | 7 | C | — | — | — | 2132 | 72 | 105 | A | — |
| Co-EX. 6 | 14 | C | — | — | — | 1536 | 38 | 105 | B | — |

As seen clearly from TABLE 3, in the lens substrate (microlens substrate) of the invention, the variation of light transmission (Y value) was made to be small. On the other hand, in the lens substrate (lenticular lens substrate) in Comparative Example 6, the variation of light transmission (Y value) was made to be large.

Further, as seen clearly from TABLE 3, the rear projection in each of Examples 1 to 8 according to the invention had excellent contrast and excellent angle of view characteristics and no problem for the long-term stability. Moreover, an excellent image having no color heterogeneity could be displayed on each of the rear projections of the invention. In other words, an excellent image could be displayed on each of the rear projections of the invention stably for a long time.

On the other hand, sufficient contrast could not be obtained in the rear projection in each of Comparative Examples 1 to 6. It was thought that this was because prevention of reflection of outside light and securement of sufficient light transmission in the incident light (light required to form an image) could not be compatible even though the lens substrate had the colored portion, for example, in the case where the content by percentage of the coloring agent in the colored portion was even, or the case where the colored portion was provided at the light emission surface side of the lens substrate. Further, in Comparative Example 6 in which the colored portion was formed by stacking the uncured coloring resin on the surface of the transparent resin, not only the contrast was insufficient, but also the color heterogeneity appeared remarkably, and as a result, only the image having a low image quality could be displayed on the screen. It was thought that this was because the variation in the thickness of the colored portion was made to become large.

What is claimed is:

1. A lens substrate having a first surface and a second surface opposite to the first surface, light being allowed to enter the lens substrate from the first surface thereof and then exit from the second surface thereof, the lens substrate comprising:
   a plurality of convex lenses formed on the first surface of the lens substrate from which the light is allowed to enter the lens substrate; and
   a colored portion provided on the first surface of the lens substrate with the plurality of convex lenses, the colored portion being constituted from a plurality of regions each having a different content by percentage of a coloring agent, the plurality of regions being laminated in the thickness direction of the colored portion.

2. The lens substrate as claimed in claim 1, wherein the plurality of regions comprises:
   a first region provided on the first surface of the lens substrate, the first region having a predetermined content by percentage of the coloring agent; and
   a second region provided on the first region, the second region having content by percentage higher than that of the first region.

3. The lens substrate as claimed in claim 2, wherein, in the case where the thickness of the first region is defined as $D_1$ (μm) and the thickness of the second region is defined as $D_2$ (μm), then $D_1$ and $D_2$ satisfy the relation: $0.1 \leq D_1/D_2 \leq 80$.

4. The lens substrate as claimed in claim 1, wherein each of the plurality of regions is a layer having the different content by percentage of the coloring agent, the colored portion being constituted from a laminated structure including the plurality of layers.

5. The lens substrate as claimed in claim 1, wherein the lens substrate includes a microlens substrate.

6. The lens substrate as claimed in claim 1, wherein the lens substrate is formed of an acrylic based resin as a main material.

7. The lens substrate as claimed in claim 1, wherein the thickness of the colored layer is in the range of 1 to 10 μm.

8. A transmission screen comprising:
   a Fresnel lens formed with a plurality of concentric prisms on one major surface thereof, the one major surface of the Fresnel lens constituting an emission surface thereof; and
   the lens substrate defined by claim 1, the lens substrate being arranged on the side of the emission surface of the Fresnel lens so that the first surface thereof faces the Fresnel lens.

9. A rear projection device comprising the transmission screen defined by claim 8.

* * * * *